(12) United States Patent
Jarvinen et al.

(10) Patent No.: US 9,632,683 B2
(45) Date of Patent: Apr. 25, 2017

(54) METHODS, APPARATUSES AND COMPUTER PROGRAM PRODUCTS FOR MANIPULATING CHARACTERISTICS OF AUDIO OBJECTS BY USING DIRECTIONAL GESTURES

(71) Applicant: NOKIA TECHNOLOGIES OY, Espoo (FI)

(72) Inventors: Kari Juhani Jarvinen, Tampere (FI); Marko Tapani Yliaho, Tampere (FI); Jussi Kalevi Virolainen, Espoo (FI); Antti Heikki Tapio Sassi, Pirkkala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 375 days.

(21) Appl. No.: 13/672,564

(22) Filed: Nov. 8, 2012

(65) Prior Publication Data
US 2014/0129937 A1   May 8, 2014

(51) Int. Cl.
*G06F 3/0484* (2013.01)
*G06F 3/01* (2006.01)
(Continued)

(52) U.S. Cl.
CPC .......... *G06F 3/04847* (2013.01); *G06F 3/017* (2013.01); *G06F 3/0487* (2013.01);
(Continued)

(58) Field of Classification Search
None
See application file for complete search history.

(56) References Cited

U.S. PATENT DOCUMENTS

| 7,346,654 B1 * | 3/2008 | Weiss | H04N 7/15 348/E7.083 |
| 7,617,094 B2 * | 11/2009 | Aoki | H04M 3/564 370/260 |

(Continued)

FOREIGN PATENT DOCUMENTS

WO   WO-2011/076286 A1   6/2011

OTHER PUBLICATIONS

Bevilacqua, Frédéric, "Gesture Control of Music Systems," 2010, Retrieved from <http://diuf.unifr.ch/diva/3emeCycle2010/presentations/FBevilacqua_gestrecoSeminar2010.pdf> on May 20, 2013, 90 pages.

(Continued)

*Primary Examiner* — Maryam Ipakchi
(74) *Attorney, Agent, or Firm* — Alston & Bird LLP

(57) ABSTRACT

An apparatus for enabling manipulation of one or more audio objects may include a processor and memory storing executable computer program code that cause the apparatus to at least perform operations including detecting at least one audio object and operating a pointer in a selected direction by a user. The computer program code may further cause the apparatus to detect a gesture of the pointer in response to the operating of the pointer in the selected direction. The computer program code may further cause the apparatus to control at least one characteristic of the detected audio object in response to the detected gesture of the pointer or an indication of a selection of the at least one characteristic. Corresponding methods and computer program products are also provided.

23 Claims, 12 Drawing Sheets

(51) Int. Cl.
*G06F 3/0487* (2013.01)
*G08C 17/02* (2006.01)
*H04B 1/20* (2006.01)

(52) U.S. Cl.
CPC ......... *G08C 17/02* (2013.01); *G08C 2201/32* (2013.01); *G08C 2201/71* (2013.01); *H04B 1/202* (2013.01)

(56) References Cited

U.S. PATENT DOCUMENTS

| | | | |
|---|---|---|---|
| 7,783,594 B1 | 8/2010 | Pachikov | |
| 8,805,010 B2* | 8/2014 | Horvitz | G06K 9/00771 382/103 |
| 9,069,065 B1* | 6/2015 | Coley | G01S 3/8006 |
| 2008/0252595 A1* | 10/2008 | Boillot | 345/156 |
| 2008/0259731 A1 | 10/2008 | Happonen | |
| 2010/0169781 A1* | 7/2010 | Graumann et al. | 715/727 |
| 2010/0289743 A1* | 11/2010 | Sun et al. | 345/158 |
| 2010/0316232 A1* | 12/2010 | Acero | H04R 27/00 381/92 |
| 2011/0026765 A1 | 2/2011 | Ivanich et al. | |
| 2011/0090407 A1* | 4/2011 | Friedman | H04N 21/42204 348/734 |
| 2011/0153044 A1* | 6/2011 | Lindahl | G06F 3/0482 700/94 |
| 2011/0154249 A1* | 6/2011 | Jang et al. | 715/781 |
| 2011/0296353 A1* | 12/2011 | Ahmed et al. | 715/848 |
| 2012/0124470 A1* | 5/2012 | West | G06F 3/0488 715/702 |
| 2012/0206452 A1* | 8/2012 | Geisner | G02B 27/017 345/419 |
| 2013/0022214 A1* | 1/2013 | Dickins | H04R 1/083 381/74 |
| 2013/0120251 A1* | 5/2013 | Lee | G06F 3/1438 345/157 |
| 2013/0154930 A1* | 6/2013 | Xiang | G06F 3/167 345/158 |
| 2013/0156220 A1* | 6/2013 | Bar-Zeev | G10L 21/0208 381/92 |
| 2013/0279706 A1* | 10/2013 | Marti | G06F 3/165 381/57 |
| 2013/0346168 A1* | 12/2013 | Zhou et al. | 705/14.4 |
| 2014/0201689 A1* | 7/2014 | Bedikian | G06F 3/011 715/863 |

OTHER PUBLICATIONS

Gordon, Kyana, "TEDGlobal: Imogen Heap's Musical Gloves Manipulate Sound with Hand Gestures," Jul. 12, 2011, Retrieved from <psfk.com/2011/07/tedglobal-imogen-heaps-musical-gloves-manipulate-sound-with-hand-gestures.html> on Jul. 25, 2012, 4 pages.

Leap, "Introducing Leap Motion," Oct. 17, 2012, Internet Archive <http://web.archive.org/web/20121017115030/https://leapmotion.com/>, 2 pages.

Marshall, Mark T., et al., "Gesture Control of Sound Spatialization," (Abstract) Retreived from <http://www.google.co.in/url?sa=t&rct=j&q=gesture%20(manipulate%20%7C%20change%20%7C%20modify%20%7C%20alter%20%7C%20control)%20(music%20%7C%20audio%20%7C%20sound)%20%20(3d%20%7C%203-dimentional%20%7C%20%22surround%20sound%22%20%7C%20%22surround%20audio%22)&source=web&cd=9&ved=0CG8QFjAI&url=http%3A%2F%2Fwww.idmil.org%2F_media%2Fprojects%2Fpapers%2Fabstract_gw07_marshallmallochwanderley.pdf%3Fid%3Dprojects%253Aspatialization%26cache%3Dcache&ei=8JQPUOGNCMLOrQeX9oCIAQ&usg=AFQjCNFySLGtfaswYV5sggvAxW2XEkE6nQ>, on May 20, 2013, 2 pages.

Marshall, Mark T., et al., "Gesture Control of Sound Spatialization for Live Musical Performance," In the Proceedings of the 7th International Gesture Workshop in Lisbon, Portugal, May 2007, pp. 227-238, Springer-Verlag, Germany.

Schacher, Jan C., "Gesture Control of Sounds in 3D Space," In the Proceedings of the Seventh International Conference on New Interfaces for Musical Expression (NIME) in New York, New York, Jun. 7-9, 2007, 5 pages, USA.

* cited by examiner

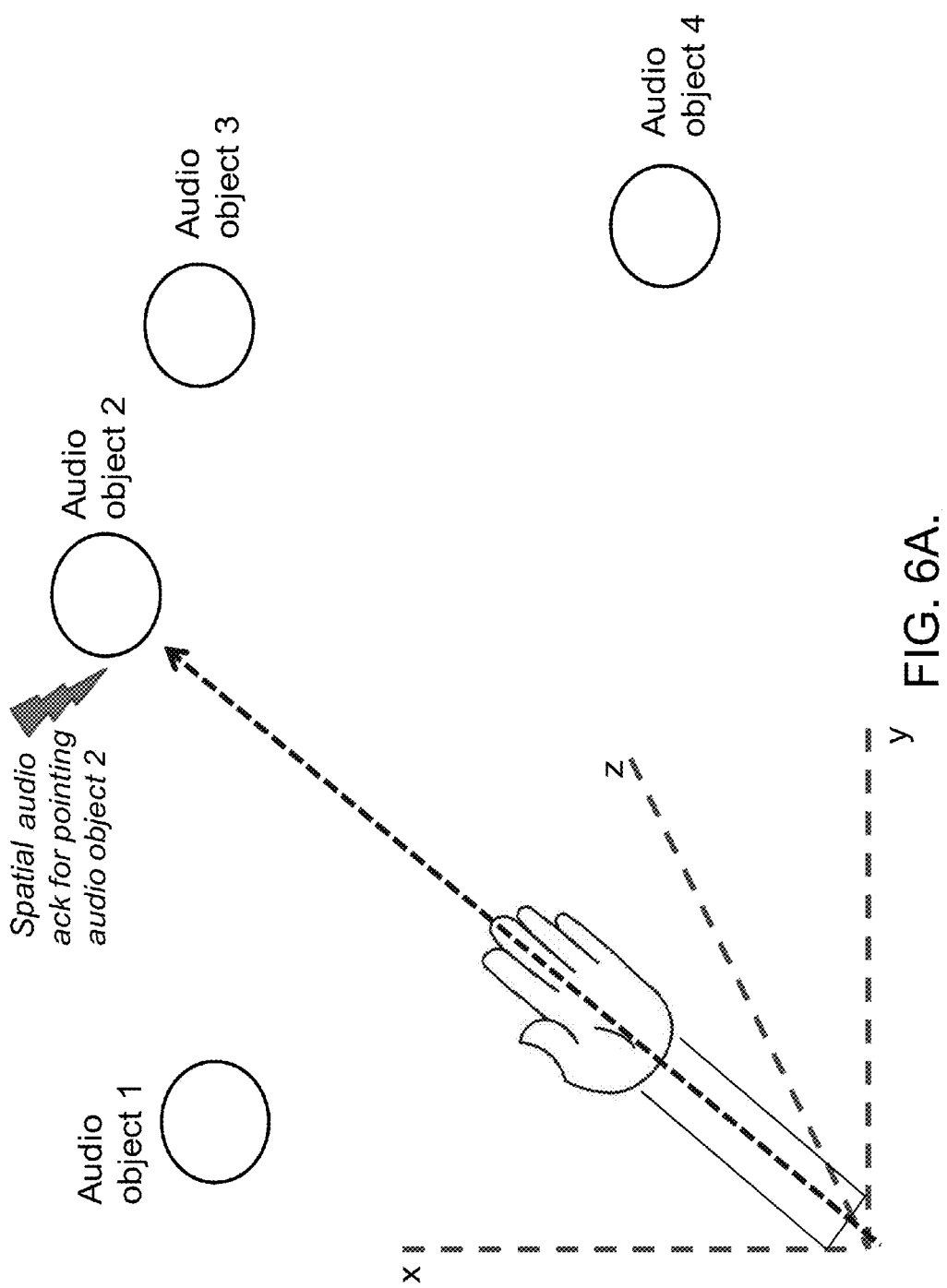

METHODS, APPARATUSES AND COMPUTER PROGRAM PRODUCTS FOR MANIPULATING CHARACTERISTICS OF AUDIO OBJECTS BY USING DIRECTIONAL GESTURES

TECHNOLOGICAL FIELD

Embodiments of the present invention relate generally to spatial audio management and, more particularly, relate to a method, apparatus, and computer program product for manipulating characteristics of spatial audio objects.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, etc. The services may also be in the form of interactive applications in which the user may respond to a network device in order to perform a task or achieve a goal. The services may facilitate output of audio enabling a user to listen to the audio from a communication device such as, for example, a mobile telephone, a mobile television, a mobile gaming system, etc.

Currently, when listening to surround sound audio, a user may want to manipulate the audio signal the user is listening to. For example, the user may want to increase the loudness of the audio objects (e.g., audio signals) that are disturbed by background noise (e.g., of the local listening environment) coming from the same spatial direction(s). As another example, the user may want to increase the loudness of audio objects that are most interesting to the user (for example, such as in a teleconference the most important speakers or the speakers that address issues of the most interest to the user), or that simply have too low of a sound volume. In an instance in which an event in the listening environment occurs suddenly and requires the user to pay attention (e.g., a person enters a room), the user may want to temporarily lower the sound volume of the audio object(s) located in a direction while leaving other audio objects intact, thus allowing the user to continue listening without interruption. For example, during a teleconference the user may want to quickly re-position some audio objects for increased clarity (e.g., move the audio objects further away from each other or from disturbing local noise sources around the user). As another example, in an instance in which a user listens to music, the user may want to modify the characteristics of some audio objects to enhance the listening experience.

Object based surround sound may enable rich manipulation of an audio scene since each audio object may be individually manipulated. However, currently the problem is that there are no suitable user-friendly interfaces/methods for such manipulation. At present, manipulation requires the user to be visually connected with a portable device (e.g., that the user is using for listening) which may make the manipulation cumbersome, non-inviting and slow, and it also may effectively prevent new applications and systems (involving such manipulation) from emerging. As such, object based surround sound may be unable to be utilized to its fullest potential unless efficient and easy-to-use methods with natural interaction are developed for manipulating surround audio.

BRIEF SUMMARY

A method, apparatus and computer program product are therefore provided according to an example embodiment for manipulating characteristics of audio objects. For example, an example embodiment may enable manipulating of characteristics of audio objects by using one or more directional gestures. In this regard, the directional gestures may be utilized to manipulate spatial audio characteristics of the audio objects.

The method, apparatus and computer program product according to an example embodiment may be configured to manipulate characteristics of audio objects by using directional gestures (e.g., gesturing in a particular direction with a bare hand or with a communication device). The characteristics that are manipulated may include, but are not limited to, loudness, sound source orientation, distance from a user/listener, source location, echo, sustain, equalization, reverberation, delay, muting, or any other suitable characteristics (e.g., sound source size). In an example embodiment, a user may choose a particular audio object (e.g., an audio signal (e.g., a spatial audio signal)) to be manipulated by pointing towards a source (e.g., a virtual source) of the audio object with a hand of the user or with a communication device (for example, a smartphone which the user is utilizing to listen to the audio). The characteristic(s) to be altered and the amount in which the characteristic(s) may be altered may be identified or determined by the manner in which a hand(s), palm(s), finger(s), or a communication device are moved. The gestures may be detected to (1) identify an audio object (e.g., an audio signal (e.g., a spatial audio signal)) to be manipulated, (2) identify a particular characteristic(s) to be manipulated and/or (3) identify an amount of manipulation.

An example embodiment may enable easy, quick and natural manipulation of surround sound audio since a user may manipulate the spatial audio that the user may be listening to with a clear association between the actions of the user in the physical space around the user as well as the spatial audio around the user. This may enable instant manipulation of the audio objects. As such, the user may be able to interact quickly and precisely with the audio objects. An example embodiment may be used with any object based surround sound application or system to enable a user/listener to interact with the audio objects and manipulate the audio objects to enhance user experience and enable the user/listener to enjoy new experiences.

In one example embodiment, a method for enabling manipulation of one or more audio objects is provided. The method may include detecting at least one audio object and operating a pointer in a selected direction by a user. The method may also include detecting a gesture of the pointer in response to the operating of the pointer in the selected direction. The method may also include controlling at least one characteristic of the detected audio object in response to the detected gesture of the pointer or an indication of a selection of the at least one characteristic.

In another example embodiment, an apparatus for enabling manipulation of one or more audio objects is provided. The apparatus may include a processor and a memory including computer program code. The memory and computer program code are configured to, with the processor, cause the apparatus to at least perform operations including detecting at least one audio object and operating a pointer in a selected direction by a user. The memory and computer program code are further configured to, with the processor, cause the apparatus to detect a gesture of the pointer in response to the operating of the pointer in the selected direction. The memory and computer program code are further configured to, with the processor, cause the apparatus to control at least one characteristic of the detected audio object in response to the detected gesture of the pointer or an indication of a selection of the at least one characteristic.

In another example embodiment, a computer program product for enabling manipulation of one or more audio objects is provided. The computer program product includes at least one computer-readable storage medium having computer-readable program code portions stored therein. The computer-executable program code instructions may include program code instructions configured to detect at least one audio object and operate a pointer in a selected direction by a user. The program code instructions may also be configured to detect a gesture of the pointer in response to the operating of the pointer in the selected direction. The program code instructions may also be configured to control at least one characteristic of the detected audio object in response to the detected gesture of the pointer or an indication of a selection of the at least one characteristic.

BRIEF DESCRIPTION OF THE SEVERAL VIEWS OF THE DRAWINGS

Figure 1:
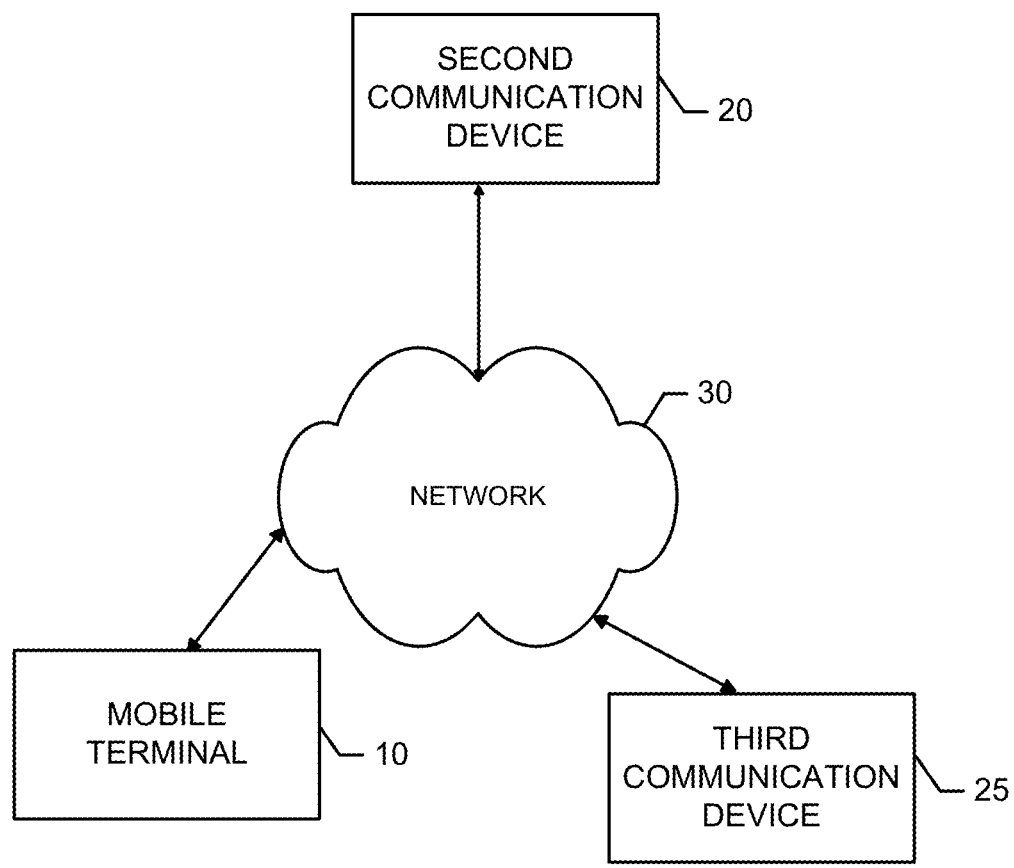
Figure 2:
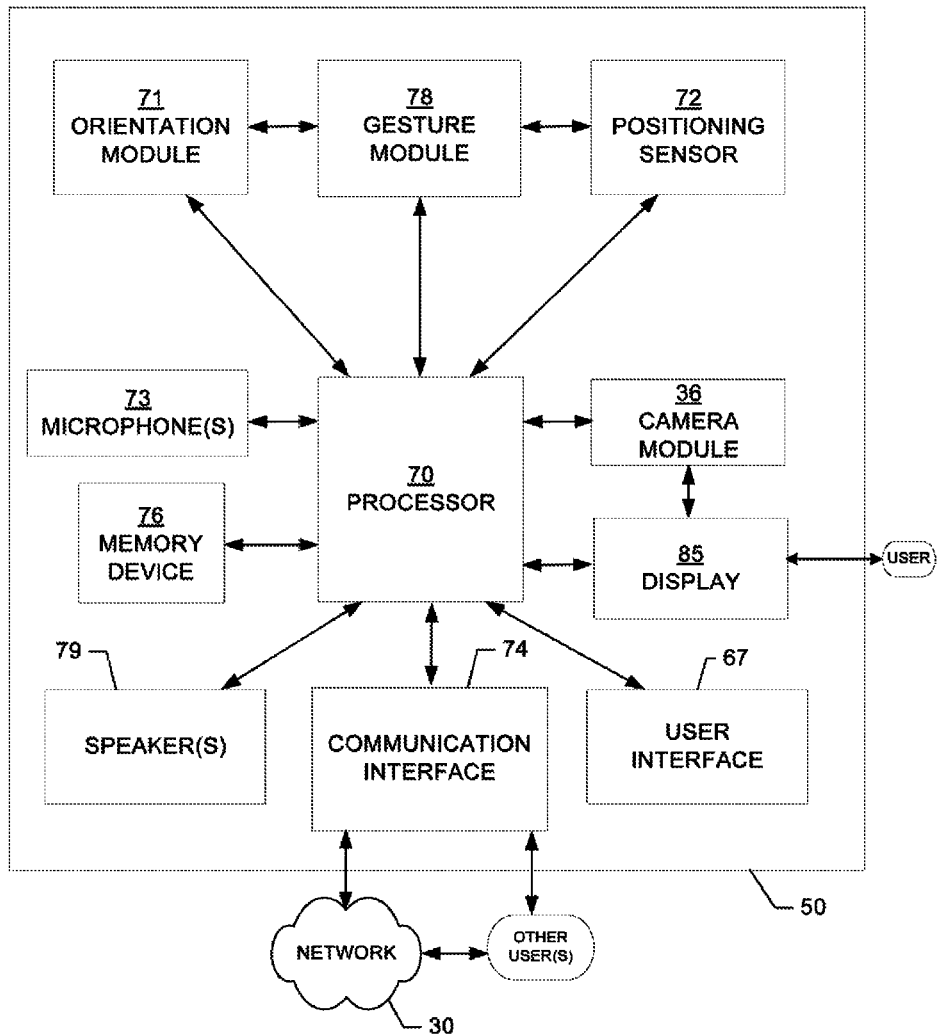
Figure 3:
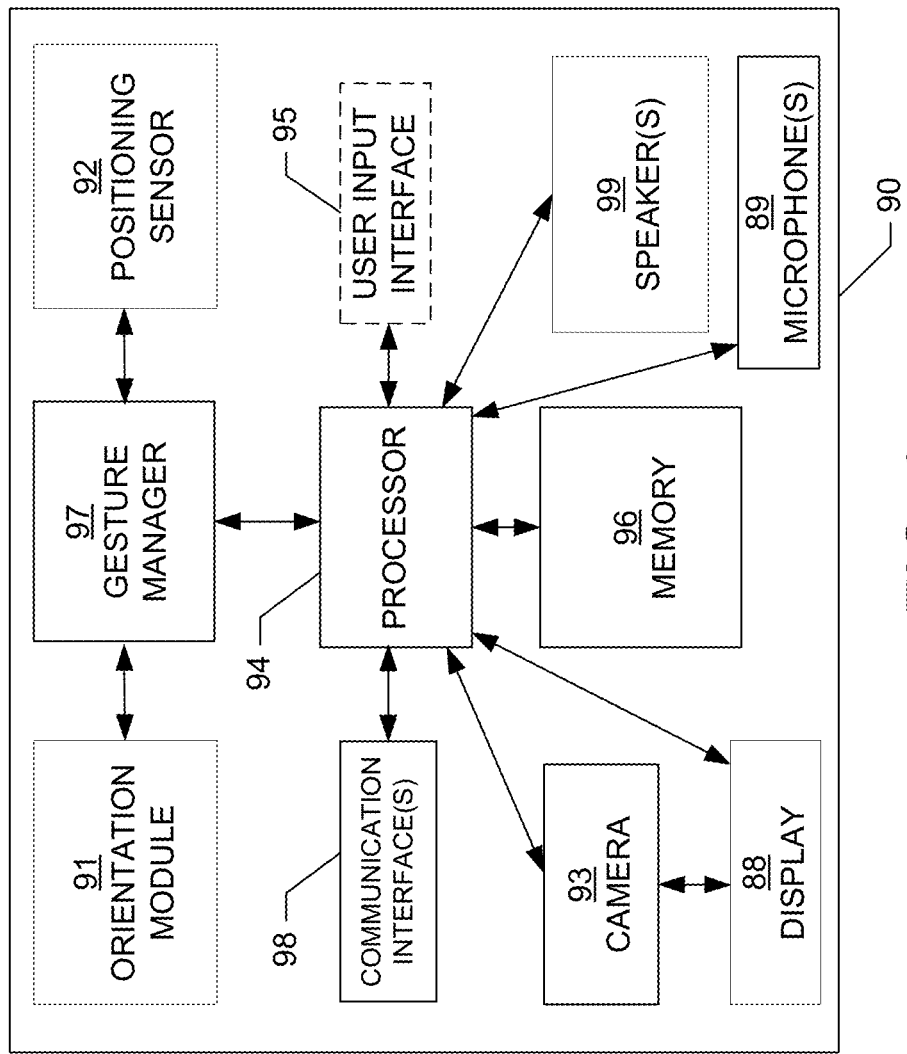
Figure 4:
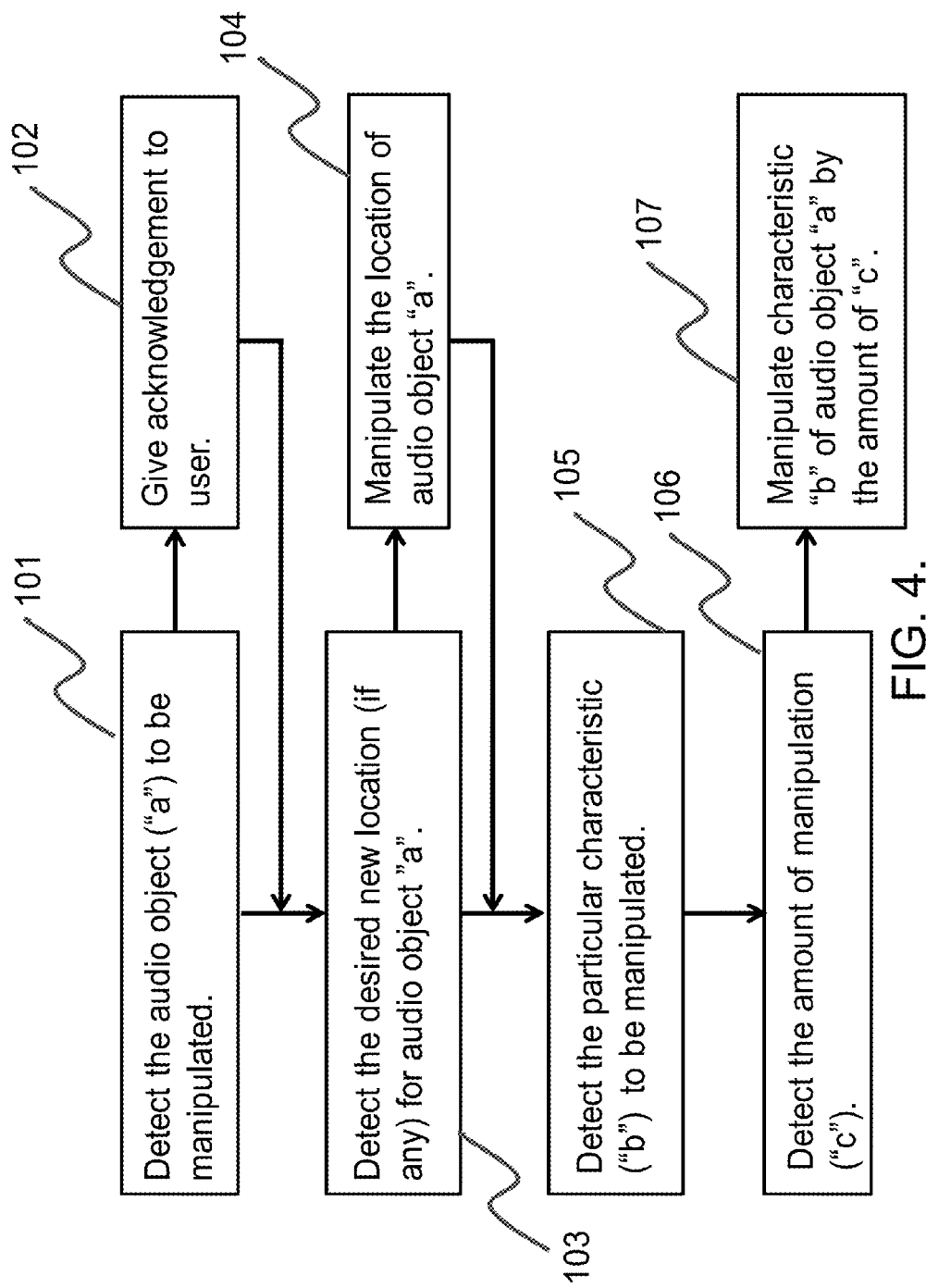
Figure 5:
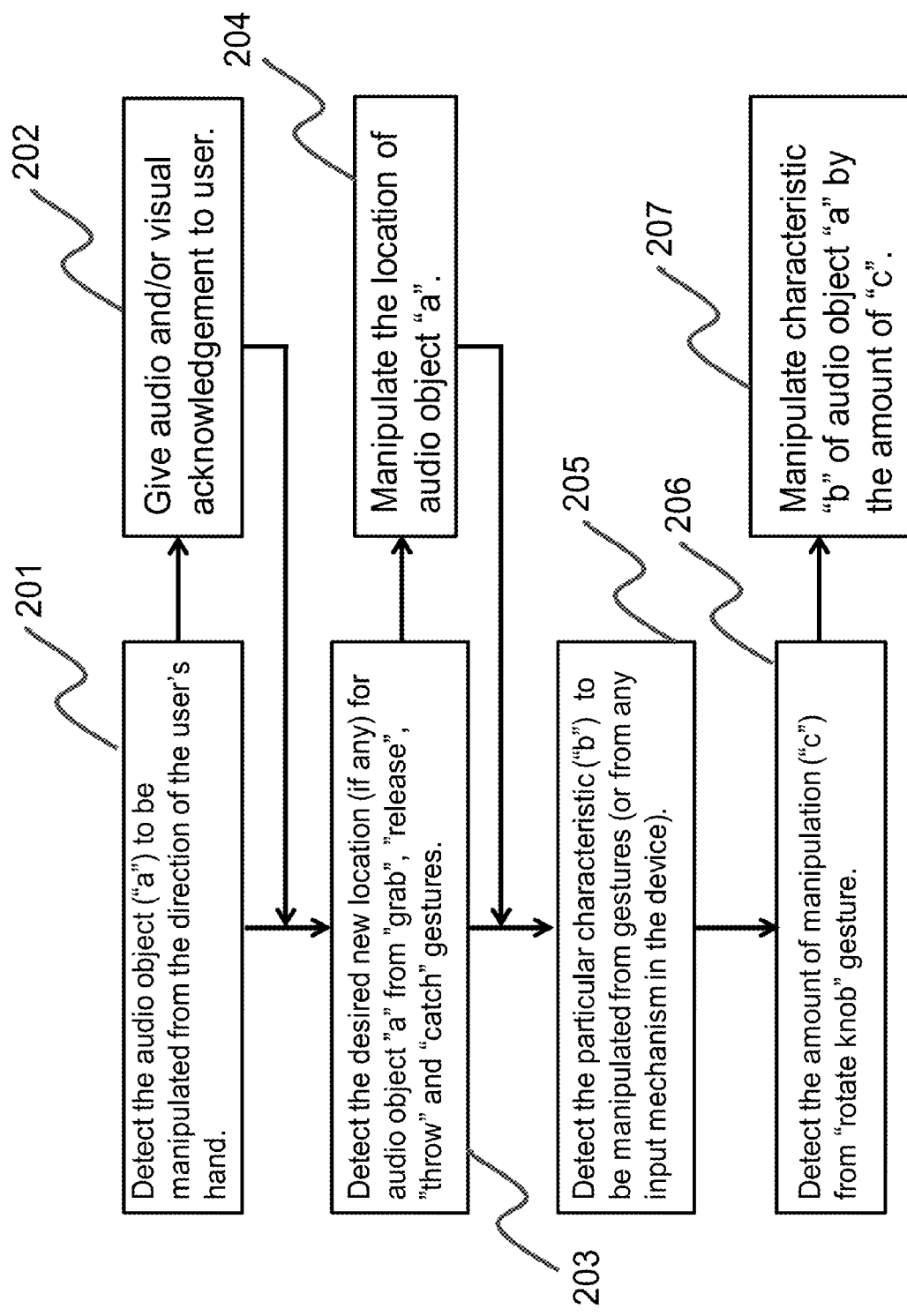
Figure 6B:
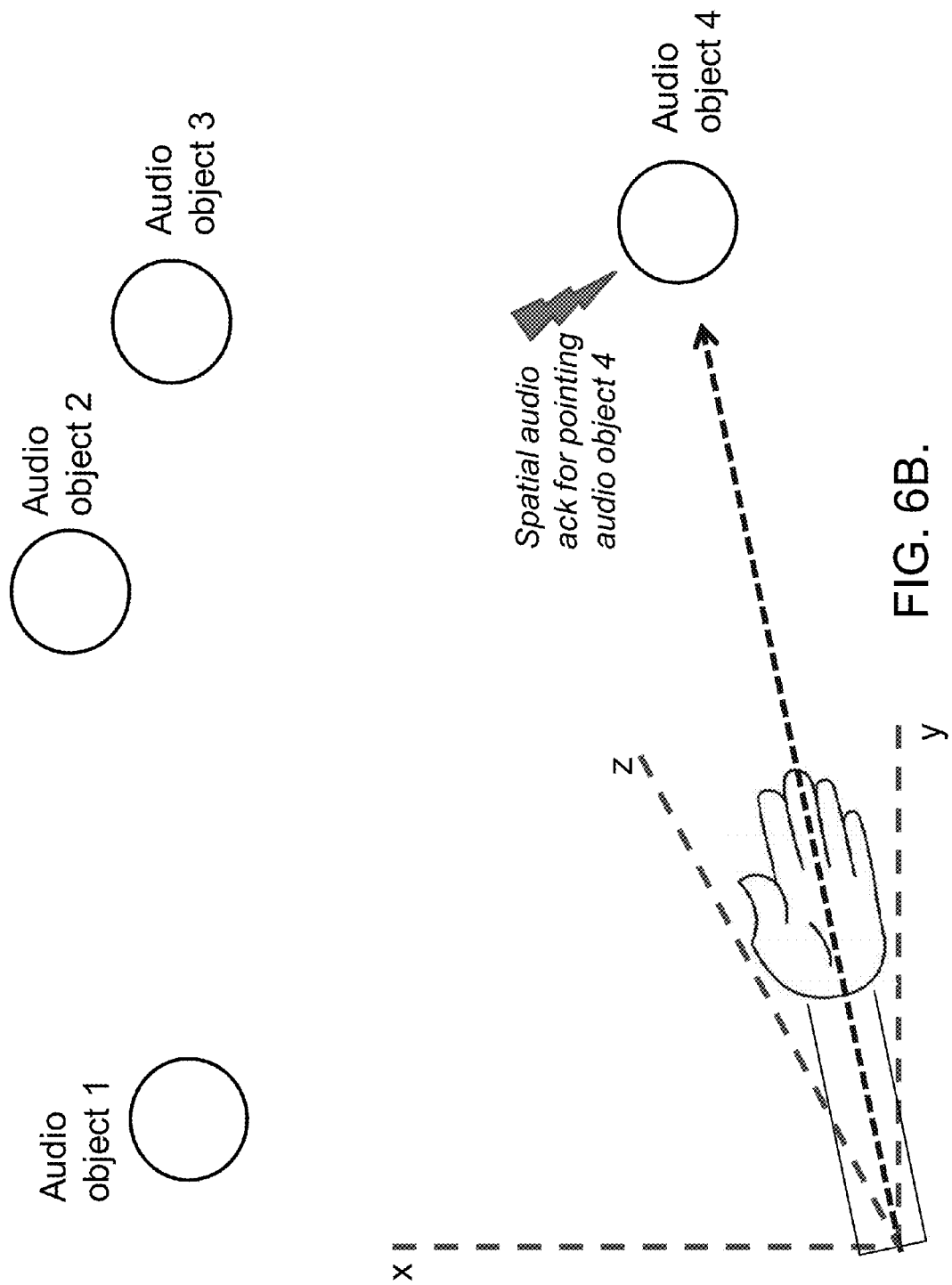
Figure 7:
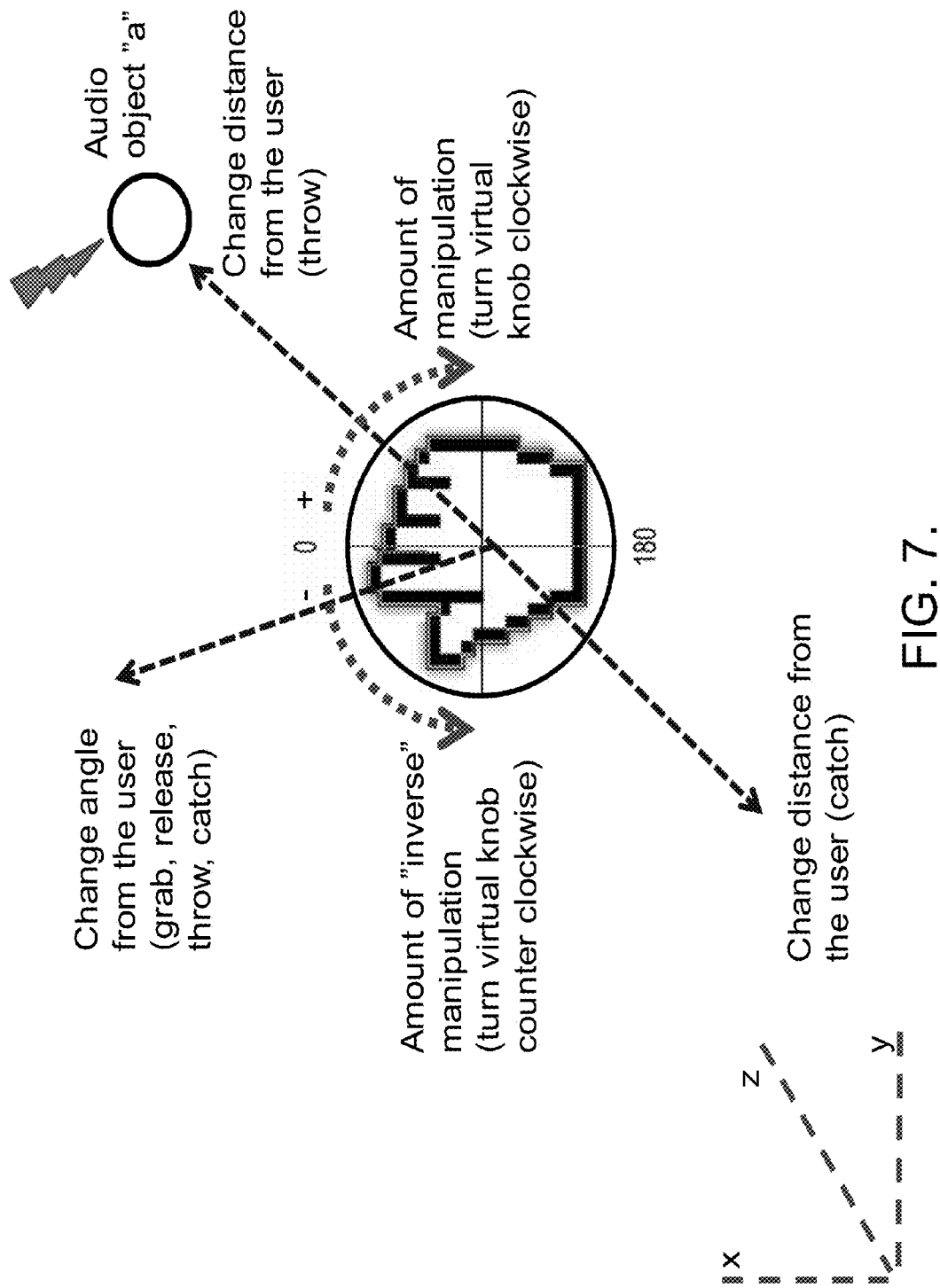
Figure 8:
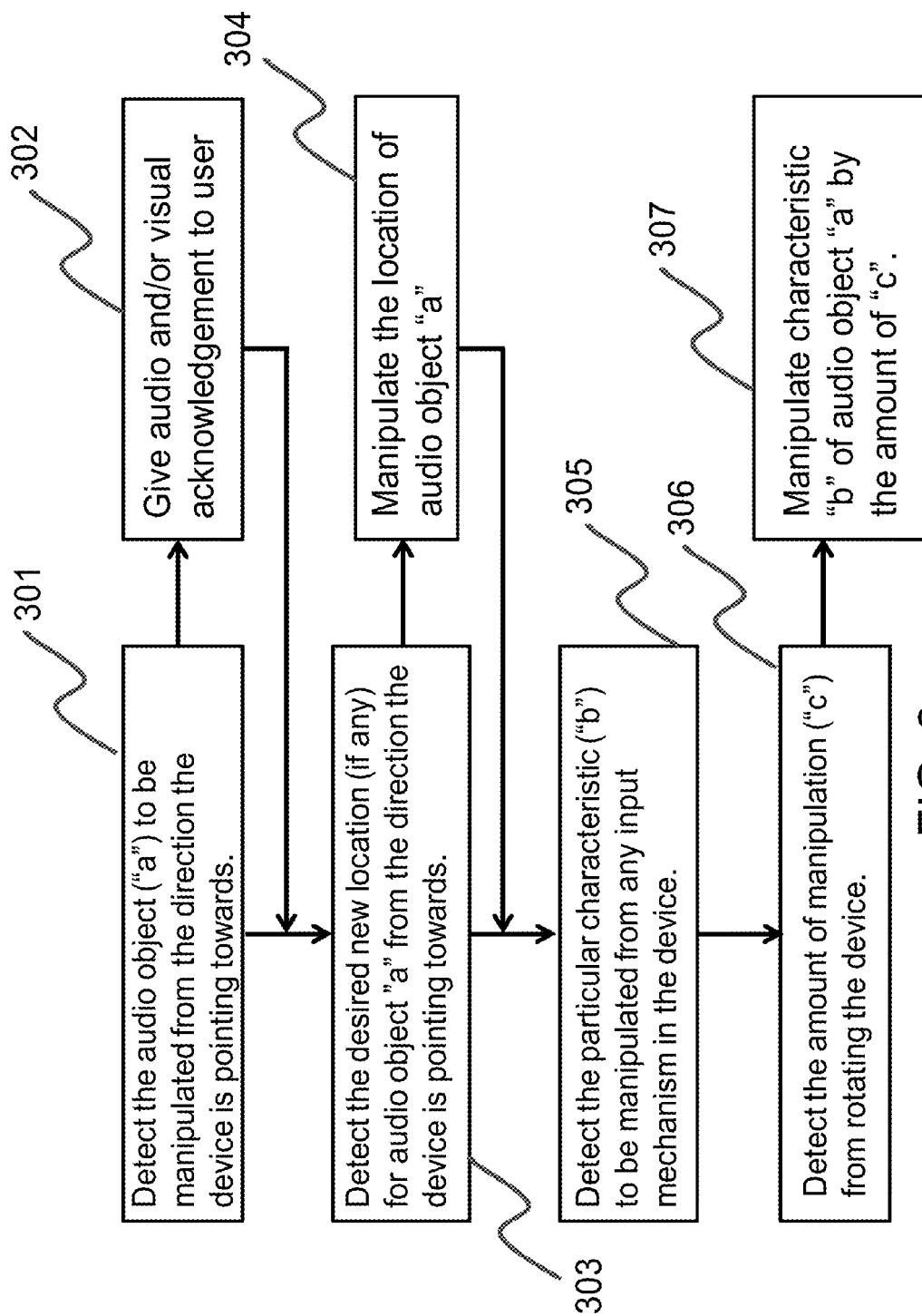
Figure 9:
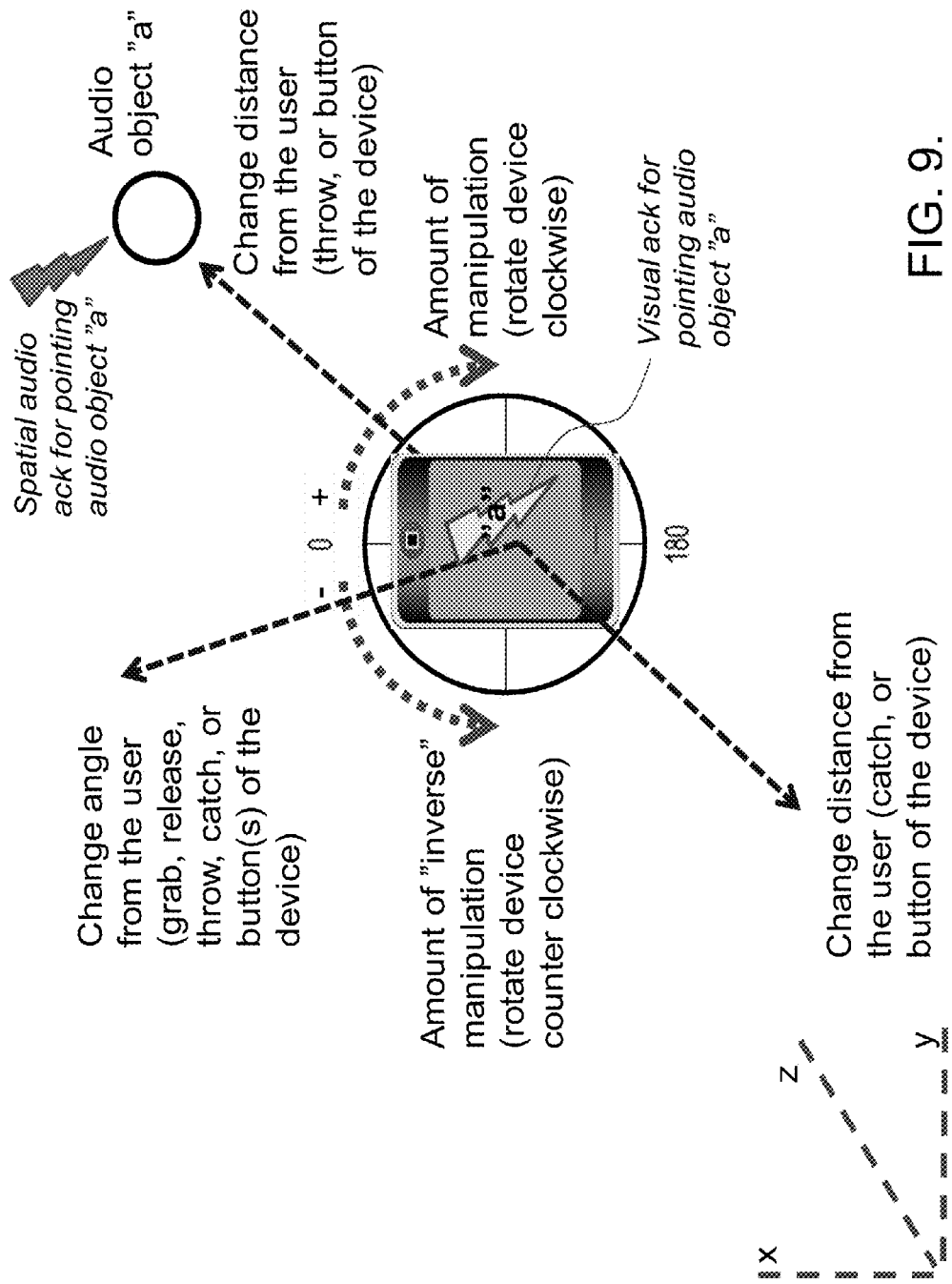
Figure 10:
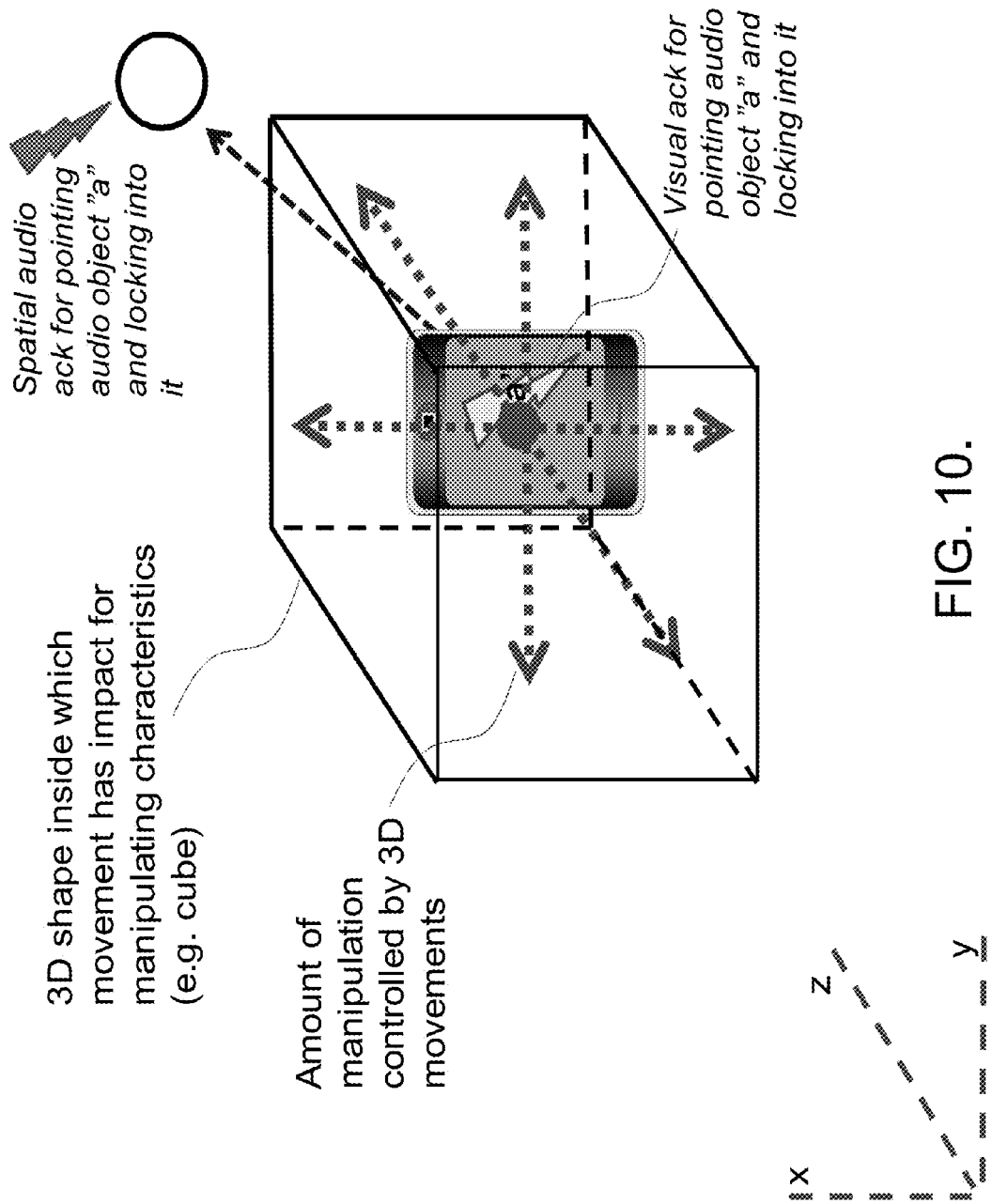
Figure 11:
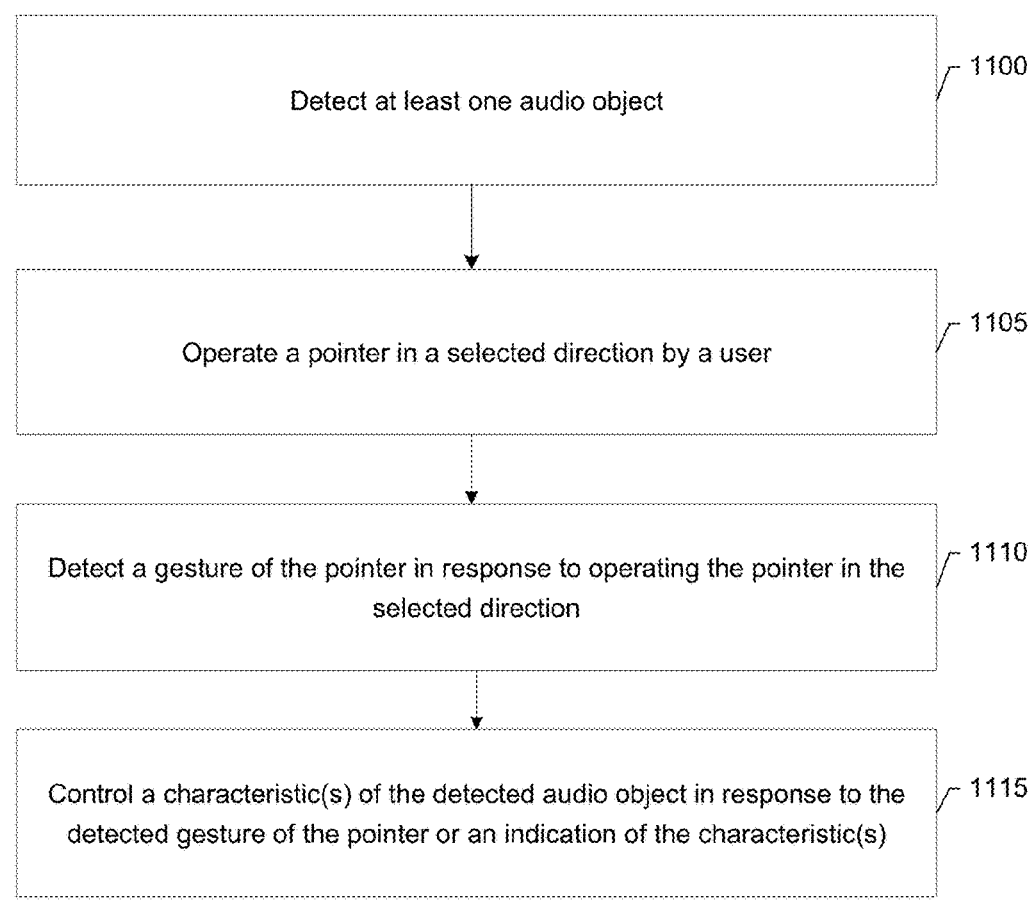

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of a communication device according to an example embodiment of the invention;

FIG. 4 illustrates a flow diagram according to an example embodiment of the invention;

FIG. 5 illustrates a flow diagram according to another example embodiment of the invention;

FIGS. 6A and 6B are diagrams illustrating a manner in which to select an audio object according to an example embodiment of the invention;

FIG. 7 is a diagram illustrating a manner in which to manipulate characteristics of an audio object according to an example embodiment of the invention;

FIG. 8 illustrates a flow diagram according to an example embodiment of the invention;

FIG. 9 is a diagram illustrating a manner in which to manipulate characteristics of an audio object according to an example embodiment of the invention;

FIG. 10 is a diagram illustrating a manner in which to manipulate characteristics of an audio object according to another example embodiment of the invention; and FIG. 11 is a flowchart of an example method of enabling manipulation of one or more audio objects according to an example embodiment of the invention.

DETAILED DESCRIPTION

Some embodiments of the invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, an "audio object(s)" may refer to an audio signal(s). In an example embodiment, the audio signal(s) may be, for example, a spatial audio signal(s), which may have a defined spatial position. In another example embodiment, the audio signal(s) may be a non-spatial signal(s) (e.g., a non-3D-spatial signal(s)) and may include, but are not limited to, a stereophonic audio signal(s), a monophonic audio signal(s) or any other suitable audio signal(s). Additionally, as referred to herein, an audio object(s) may be "selected" in an instance in which a user points a hand(s), palm(s), finger(s) or a device in a direction towards the audio object(s). In an alternative example embodiment, an audio object(s) may be a spatial audio object(s) corresponding to an audio source(s) with additional side information that forms the audio object(s). The audio source(s) may be an audio signal(s) (e.g., a spatial audio signal(s)) and the side information may include one or more properties such as, for example, spatial position, source orientation, etc. The audio object(s) may be independent from a reproduction technique and/or a reproduction setup (e.g., loudspeaker positions).

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 1 as a third communication device 25. In one embodiment, not all systems that employ an embodiment of the present invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), tablets, pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all-inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a peer-to-peer (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example, one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP), Real-time Transport Protocol (RTP), Session Initiation Protocol (SIP), Real Time Streaming Protocol (RTSP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, Radio Frequency (RF), Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, tablet computing device, camera, video recorder, audio/video player, positioning device, game device (e.g., game consoles, gaming controllers (e.g., gaming wristbands, gaming bracelets), etc.), television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal 10 as well as the second and third communication devices 20 and 25 may employ an apparatus (e.g., apparatus of FIG. 2) capable of employing an embodiment of the invention.

FIG. 2 illustrates a schematic block diagram of an apparatus according to an example embodiment. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, an orientation module 71, a positioning sensor 72, one or more speakers 79, one or more microphones 73, a camera module 36 and a gesture module 78. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, images, videos, audio data, etc.).

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example. The processor 70 may also be in communication with a display 85 and may instruct the display to illustrate any suitable information, data, content (e.g., media content) or the like.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The microphones 73 (also referred to herein as microphone(s) 73) may include a sensor that converts captured sound/audio into an audio signal(s). The audio signal(s) corresponding to the audio captured by one or more of the microphones 73 may be output via one or more speakers 79.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like). The speakers 79 (also referred to herein as speaker(s) 79) may produce sound in response to an electrical audio signal input. The speakers 79 may include, but are not limited, to loudspeakers, headphones, headsets or any other suitable speakers.

The display 85 may be a touch screen display configured to enable touch recognition, hover recognition, leap recognition, or the like by any suitable technique, such as resistive, capacitive, infrared, strain gauge, surface wave, optical imaging, dispersive signal technology, acoustic pulse recognition, or other like techniques. The display 85 may also detect finger movements just above the display even in an instance in which the finger may not actually touch a touch screen of the display 85. The touch screen of the display 85 may receive indications of user inputs at the touch screen of the display 85 and may modify a response to such indications based on corresponding user actions that may be inferred or otherwise determined responsive to the indications.

The touch screen of the display 85 may be configured to receive an indication of an input in the form of a touch event at the display 85. Following recognition of the touch event, the touch screen of the display 85 may be configured to thereafter detect a stroke event or other input gesture and provide a corresponding indication on the display 85 based on the stroke event.

A touch event may be defined as a detection of an object, such as a stylus, finger(s), palm(s), hand(s), pen, pencil or any other pointing device, coming into contact with a portion of the touch screen of the display 85 in a manner sufficient to register as a touch (or registering of a detection of an object just above the touch screen of the display 85 (e.g., hovering of a finger(s), a leap motion of a finger(s), etc.). In this regard, for example, a touch event could be a detection of pressure on the touch screen of the display 85 above a particular pressure threshold over a given area. In one alternative embodiment, a touch event may be a detection of pressure on the touch screen of the display 85 above a particular threshold time. Subsequent to each touch event, the touch screen of the display 85 may be further configured to recognize and/or determine a corresponding stroke event or an input gesture(s) (e.g., predefined simulated gestures (e.g., a grab gesture, release gesture, throw gesture, catch gesture, etc.)).

The apparatus 50 may include a media capturing element, such as camera module 36. The camera module 36 may include a camera, video and/or audio module, in communication with the processor 70 and the display 85. The camera module 36 may be any means for capturing an image, video and/or audio for storage, display or transmission. For example, the camera module 36 may include a digital camera capable of forming a digital image file from a captured image. As such, the camera module 36 may include all hardware, such as a lens or other optical component(s), and software necessary for creating a digital image file from a captured image. Alternatively, the camera module 36 may include only the hardware needed to view an image, while a memory device (e.g., memory device 76) of the apparatus 50 stores instructions for execution by the processor 70 in the form of software necessary to create a digital image file from a captured image. In an example embodiment, the camera module 36 may further include a processing element such as a co-processor which assists the processor 70 in processing image data and an encoder and/or decoder for compressing and/or decompressing image data. The encoder and/or decoder may encode and/or decode according to a Joint Photographic Experts Group, (JPEG) standard format or other like formats for two-dimensional (2D), three-dimensional (3D) video such as the Motion Picture Experts Group (MPEG) formats. In some cases, the camera module 36 may provide live image data to the display 85. In this regard, the camera module 36 may facilitate or provide a camera view to the display 85 to show live image data, still image data, video data, or any other suitable data. Moreover, in an example embodiment, the display 85 may be located on one side of the apparatus 50 and the camera module 36 may include a lens positioned on the opposite side of the apparatus 50 with respect to the display 85 to enable the camera module 36 to capture images on one side of the apparatus 50 and present a view of such images to the user positioned on the other side of the apparatus 50.

In one example embodiment, the camera module 36 may capture or detect images or video of movements of a hand(s), finger(s), palm(s) or the like. The camera module 36 may capture the images or video of the movements of the hand(s), finger(s), palm(s) or the like while a user is holding the apparatus 50 and may provide this data (e.g., a three-dimensional (3D) representation of captured image data or video data) to the gesture module 78 to enable the gesture module to utilize the data, in part, to determine one or more gestures (e.g., hand gestures), as described more fully below.

In addition, the apparatus 50 may include a positioning sensor 72. The positioning sensor 72 may include, for example, a global positioning system (GPS) sensor/receiver, an assisted global positioning system (Assisted-GPS) sensor, a Bluetooth (BT)-GPS mouse, other GPS or positioning receivers or the like. However, in one example embodiment, the positioning sensor 72 may include a pedometer or inertial sensor. In this regard, the positioning sensor 72 may be capable of determining a location of the apparatus 50, such as, for example, longitudinal and latitudinal directions of the apparatus 50, or a position relative to a reference point such as a destination or start point. The positioning sensor 72 may also be capable of determining an altitude of the apparatus 50 and use the altitude information in determining the location of the apparatus 50. Information from the positioning sensor 72 may then be communicated to a memory of the apparatus 50 or to another memory device to be stored as a position history or location information.

In an example embodiment, the apparatus 50 may further include (or be in communication with) an orientation module 71. The orientation module 71 may be any means such as a device or circuitry embodied in either hardware or a combination of hardware and software that is configured to determine the orientation of apparatus 50 and/or of the field of view of the camera module 36 of the apparatus 50.

The orientation module 71 may be configured to determine the orientation of apparatus 50 relative to a reference. In some cases, the reference may be a particular direction, such as North or another cardinal direction. However, other references may also be employed. As such, in one embodiment, the orientation module 71 may include a compass or other orientation sensor, such as, for example, a gyroscope, configured to determine the heading of the apparatus 50 or direction that the lens of the camera module 36 is pointing. The direction or heading may be determined in terms of degrees (e.g., 0 to 360 degrees) offset from the reference. In some cases, the reference may be fixed (e.g., a fixed directional reference), while in other cases, the reference may be a reference of opportunity such as a prominent feature in an image captured by the camera module or simply an initial orientation.

In an example embodiment, the orientation of the field of view of the camera module 36 may be compared to the reference in order to determine the current orientation of the apparatus 50. Thus, for example, given an initial image, a particular feature may be selected as the reference. Thereafter, as the field of view is altered, the orientation module 71 may be configured to determine the orientation of the field of view of the camera module 36 based on the speed or amount of movement relative to the reference. While one embodiment may only determine orientation in a single plane (e.g., parallel to the surface of the earth), another embodiment may allow for orientation determination including an elevation aspect and/or axial aspect shifts. Thus, for example, the orientation module 71 may be configured to determine pitch and/or yaw of the apparatus 50 (e.g., pitch defining a degree of elevation and yaw defining an axial rotation). As such, for example, the orientation module 71 may include a device or other means for determining the orientation of the apparatus 50 (or the field of view of the camera module 36), which may be referred to as orientation information. In one embodiment, the orientation module 71 may include an electronic/digital compass, a horizon sensor, gravity sensor, accelerometer, gyroscope, magnetometer and/or the like or any other sensor that may be useful in determining orientation information (for example, by using inertial detection) associated with an orientation of the apparatus 50 and/or an orientation of a hand(s) of a user holding or carrying the apparatus 50.

In this regard, for example, the accelerometer may detect sensor data such as, for example, a change in acceleration of the hand(s) over time and the gyroscope and magnetometer may be utilized to detect sensor data to determine a change in position of the hand(s) relative to the apparatus 50 and/or surroundings of the apparatus 50. The acceleration and position sensor data detected by the accelerometer, the gyroscope and the magnetometer or other sensors may be provided to the gesture module 78 to enable the gesture module 78 to utilize this data, in part, to detect one or more gestures (e.g., hand gestures) based on the movement of the hand carrying/holding the apparatus 50.

In an example embodiment, the processor 70 may be embodied as, include or otherwise control the gesture module. The gesture module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the gesture module 78 as described below. Thus, in an example in which software is employed, a device or circuitry (e.g., the processor 70 in one example) executing the software forms the structure associated with such means.

In one example embodiment, the gesture module 78 may receive data from the detected acceleration and position sensor data of the accelerometer, the gyroscope and/or the magnetometer of the orientation module 71 indicating the position and acceleration of a hand(s) of a user holding/carrying apparatus 50 as well as data of images and/or video captured by the camera module 36, of the movements of the hand(s), and associated finger(s), palm(s) of the hand(s). The gesture module 78 may analyze this received information (e.g., acceleration, position, image/video data, etc.) to determine one or more gestures (e.g., hand gestures) of the user.

In response to detection of one or more gestures of a hand(s), finger(s), palm(s) of a user, the gesture module 78 may modify an audio object(s) (e.g., an audio signal (e.g., a spatial audio signal)) based in part on the movements of the hand(s) and/or the apparatus 50, as described more fully below.

In another example embodiment, the gesture module 78 may receive detected acceleration and position sensor data of an accelerometer, a gyroscope, a magnetometer or other sensor(s) of an external device (e.g., communication device 90 of FIG. 3) indicating the position and acceleration of a hand(s) (e.g., a bare hand (e.g., a hand(s) that may not necessarily be holding apparatus 50)). The gesture module 78 may also receive data of images and/or video of the movements of the hand(s), associated finger(s), and/or palm(s) of the hand(s) captured by a camera (e.g., camera 93) of the external device. The gesture module 78 may analyze this information (e.g., acceleration, position, image/video data, etc.) received from the external device to determine one or more gestures (e.g., hand gestures) of the user. In this alternative example embodiment, the gesture module 78 may detect one or more gestures of the hand(s), finger(s), and/or palm(s) of the user based on the information (e.g., acceleration, position, image/video data, etc.) received from the external device. The gesture module 78 may analyze this information to modify an audio object(s) (e.g., an audio signal (e.g., a spatial audio signal)) based in part on the movements of the hand(s), as described more fully below.

In one example embodiment, the external device may be directly connected to the apparatus 50 via the communicate interface 74 which may provide information received from the external device to the gesture module 78. In another example embodiment, the external device may not necessarily be directly connected to the apparatus 50 and instead may communicate wirelessly (for example, via a network (e.g., network 30) or a Near Field Communication (NFC)) with the gesture module 78.

Referring now to FIG. 3, a block diagram of one example of a communication device for enabling manipulation of one or more audio objects is provided. The communication device 90 may embodied in a wrist band, controller (e.g., game controller), bracelet (e.g., wrist bracelet), ring, glove, pen or any other suitable device that may be worn by a user or otherwise linked to the user (e.g., attached to a body part (e.g., a finger, a wrist, an arm) of the user). In one example embodiment, the communication device 90 may track movements of a hand(s) (e.g., a bare hand) of a user, as described more fully below. As shown in FIG. 3, the communication device 90 generally includes a processor 94 and an associated memory 96. The memory 96 may comprise volatile and/or non-volatile memory, and may store content, data and/or the like. For example, the memory may store content, data, information, and/or the like transmitted from, and/or received by, the communication device. Also for example, the memory 96 may store client applications, instructions, and/or the like for the processor 94 to perform the various operations of the network device in accordance with an embodiment of the invention, as described herein. The memory 96 may include data associated with media data (e.g., images, videos, audio data, etc.). The communication device 90 may include one or more speakers 99 (also referred to herein as speaker(s) 99). The speakers 99 may generate sound in response to receipt of an electrical audio signal input. The communication device may also include a display 88. The processor 94 may be communication with the display 88 and may instruct the display 88 to illustrate any suitable information, data, content or the like. The display 88 may also be in communication with the camera 93 and as such the display 88 may show image data, video data and any other suitable data received from the camera 93. The display 88 may be a touch screen display.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one optional user input interface 95. The user input interface 95, in turn, may comprise any of a number of devices allowing the communication device to receive data from a user, such as a keypad, a display (e.g., a touch display), a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

The microphones 89 (also referred to herein as microphone(s) 89) may include a sensor that converts captured sound/audio into an audio signal(s). The audio signal(s) corresponding to the audio captured by one or more of the microphones 89 may be output via one or more speakers 99.

The camera 93 may have similar structural characteristics and functional capabilities to the camera module 36 of FIG. 2. In this regard, the camera 93 may include a video and/or audio module, in communication with the processor 94 and display 88. The camera 93 may be any means for capturing an image, video and/or audio for storage, display or transmission.

In one example embodiment, the camera 93 may capture or detect images or video of movements of a hand(s), finger(s), palm(s) or the like. The camera 93 may capture the images or video of the movements of the hand(s), finger(s), palm(s) or the like and may provide this data (e.g., a 3D representation of captured image data or video data) to the gesture manager 97 to enable the gesture manager 97 to utilize the data, in part, to determine one or more gestures (e.g., hand gestures), as described more fully below.

The positioning sensor 92 may have similar structural characteristics and functional capabilities to the positioning sensor 71 of FIG. 2. For example, the positioning sensor 92 may include, for example, a global positioning system (GPS) sensor/receiver, an assisted global positioning system (Assisted-GPS) sensor, a Bluetooth (BT)-GPS mouse, other GPS or positioning receivers or the like. The positioning sensor 92 may be capable of determining a location of the communication device 90, such as, for example, longitudinal and latitudinal directions of the communication device 50, or a position relative to a reference point such as a destination or start point.

The orientation module 91 may have similar structural characteristics and functional capabilities to the orientation module 71 of FIG. 2. For example, the orientation module 91 may include a device or other means for determining the orientation of a hand(s), finger(s), palm(s) of a user. The orientation module 91 may include an electronic/digital compass, a horizon sensor, gravity sensor, accelerometer, gyroscope, magnetometer and/or the like or any other sensor that may be useful in determining orientation information (for example, by using inertial detection) associated with an orientation of a detected hand(s), finger(s), palm(s) of a user.

In this regard, for example, the accelerometer may detect sensor data such as, for example, a change in acceleration of the hand(s) over time and the gyroscope and magnetometer may be utilized to detect sensor data to determine a change in position of the hand(s). The acceleration and position sensor data detected by the accelerometer, the gyroscope and the magnetometer may be provided to the gesture manager 97 to enable the gesture manager 97 to utilize this data, in part, to detect one or more gestures (e.g., hand gestures) based on the movement of the hand(s).

In an example embodiment, the processor 94 may be embodied as, include or otherwise control the gesture manager 97. The gesture manager 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the gesture manager 97, as described herein. Thus, in an example in which software is employed, a device or circuitry (e.g., the processor 94 in one example) executing the software forms the structure associated with such means.

The gesture manager 97 may have similar structural characteristics and functional capabilities to the gesture module 78 of FIG. 2. In this regard, for example, the gesture manager 97 may receive detected acceleration and position sensor data of an accelerometer, a gyroscope, a magnetometer or other sensor(s) of the orientation module 91 indicating the position and acceleration of a hand(s) (e.g., a bare hand). The gesture manager 97 may also receive data of images and/or video of the movements of the hand(s), associated finger(s), and/or palm(s) of the hand(s) captured by the camera 93. The gesture manager 97 may analyze this information (e.g., acceleration, position, image/video data, etc.) (also referred to herein as sensor data) to determine one or more gestures (e.g., hand gestures) of a user. The gesture manager 97 may analyze this information to modify an audio object(s) (e.g., an audio signal (e.g., a spatial audio signal)) based in part on the detected movements of the hand(s), as described more fully below.

In an alternative example embodiment, the gesture manager 97 may provide data such as, for example, the detected acceleration, position, image/video data to the gesture module 78 of the apparatus 50. In this regard, the gesture module 78 may utilize the information to determine one or more gestures (e.g., hand gestures) of the user. Additionally, the gesture module 78 may use the information received from the gesture manager 97 to modify an audio object(s) based in part on the detected movements of the hand(s) of the user. In one example embodiment, the communication device 90 may be connected to the apparatus 50 and as such the gesture manager 97 may provide the sensor data directly to the gesture module 78. In another alternative example embodiment, the communication device 90 and the apparatus 50 may not necessarily be directly connected and in this regard, the gesture manager 97 may provide the sensor data to the gesture module 78 wirelessly (for example, via a network (e.g., network 30) or via a NFC).

In one example embodiment, a hand direction and/or hand gestures (e.g., based on a detected hand/palm/fingers) pointing towards an audio object(s) (e.g., a virtual source(s) of the audio object(s) (e.g., an audio signal(s)) may be detected to identify the audio object(s) to be manipulated, one or more characteristics to be manipulated (e.g., including location), and an amount of manipulation of the audio objects, as described more fully below.

In another example embodiment a device (e.g. apparatus 50) may be utilized as a pointer to determine one or more gestures that may be made using the device. As such, the device pointing towards an audio object(s) may be detected to identify the audio object(s) to be manipulated, one or more characteristics to be manipulated and/or an amount of manipulation of the audio objects, as described more fully below.

In an example embodiment, a user may be utilizing a multimedia device such as, for example, apparatus 50 or communication device 90 which may be playing spatial audio output from one or more speakers (e.g. speakers 79, speakers 99 (e.g., headphones, loudspeakers, etc.) while the user wishes to manipulate characteristics of the audio objects in order to improve the listening experience. For purposes of illustration and not of limitation, the user may be utilizing the apparatus 50 or communication device 90 to listen to surround sound audio and suddenly the user may hear undesirable background noise that affects the listening experience of the user. In this example, the undesirable background noise may be caused by a person entering a room of the user in a noisy/disturbing manner. As such, in this example, the user may desire to select an audio object(s) (e.g., an audio signal(s) of a speaker) in the direction of the undesirable background noise in order to manipulate the audio object(s) to minimize the impact of the undesirable background noise. For example the user may manipulate the audio object to increase the volume of the audio object to minimize the impact of the background noise.

To manipulate the characteristics of captured audio objects in order to improve a listening experience, a device (also referred to herein as a multimedia device) (e.g., apparatus 50, communication device 90) may detect actions that the user desires for the audio objects, for example, which audio objects are to be manipulated. The device may also detect the type of manipulation that is desired. For example, the device may manipulate one or more spatial audio characteristics of an audio object(s) including, but not limited to, loudness, direction, source orientation, source size, distance from listener, source location, echo, sustain, equalization, reverberation/diffuseness, delay, muting, a size of an audio object, etc. The device (e.g., apparatus 50 or communication device 90) may also detect a desired amount of the manipulation (e.g., lowering or increasing volume, an amount in which to adjust echo, etc.), as described more fully below. The user may also utilize the device to manipulate the location of an audio object(s). To assist in the selection of an audio object(s), the device may produce an acknowledgement signal such as, for example, a spatial audio signal originating from a location of a detected audio object. For example, the acknowledgement signal may acknowledge to the user that the device detected an audio object in a location to be manipulated. The device may also generate other acknowledgements in response to actions of a user.

Referring now to FIG. 4, a flow diagram according to an example embodiment is provided. The operations (e.g., operations 101-107) shown in FIG. 4 may be repeated by a device (e.g., apparatus 50 or communication device 90) for each audio object that a user desires to manipulate. In the example embodiment of FIG. 4, the apparatus 50 or the communication device may perform the functions of operations 101-107.

At operation 101, a multimedia device (e.g., apparatus 50 or communication device 90) may detect which selected audio object(s) ("a") is to be manipulated. For example, the multimedia device may determine which audio object(s) to manipulate in response to detecting a direction that the user is pointing towards with his hand(s) or with the multimedia device (e.g., a smart device (e.g., the apparatus 50)). At operation 102, the multimedia device may provide an acknowledgement (e.g., an audio signal) to the user confirming the selection of one or more audio objects.

Optionally, at operation 103, the multimedia device may detect whether the location of a selected audio object(s) is to be changed. The multimedia device may determine that a location of a selected audio object(s) is to be changed in response to detecting a specific gesture made with a hand(s), palm(s), and/or finger(s) of the user or with a specific gesture made with a multimedia device (e.g., apparatus 50). For example, the user may use a hand or a multimedia device (e.g., apparatus 50) to make a specific gesture to move the direction of a selected audio object that is being heard in a location in front of the user to another location behind the user such that the audio of the selected audio object is heard from the location behind the user. The desired new location may be any suitable location. Optionally, at operation 104, the multimedia device may manipulate the location as desired. For example, the multimedia device may move the selected audio object to the desired new location (e.g., the location behind the user in the example above).

Optionally, at operation 105, the multimedia device may detect a particular characteristic(s) ("b") of the selected audio object(s) to be manipulated. The multimedia device may detect the particular characteristic(s) to be manipulated based in part on a detected movement of a hand(s), palm(s), finger(s) (e.g., a hand gesture(s)) or the movement of a multimedia device. The multimedia device may also detect the particular characteristic to be manipulated based in part on receipt of input via an input device (e.g., user interface 67, user input interface 95). For instance, a user may utilize the input device to select one or more characteristics (e.g., predefined characteristics), for example, via buttons, menus, tabs or the like of the input device. In an example embodiment, a user may utilize the input device to define one or more particular characteristics for selection. As described above, the characteristics that may be manipulated may be spatial audio characteristics including, but not limited to, loudness, direction (e.g., source orientation), source size, distance from the user/listener, source location, echo, sustain, equalization, reverberation/diffuseness, delay, muting and any other suitable characteristics.

Optionally, at operation 106, the multimedia device may detect an amount or quantity of manipulation ("c") of the selected audio object(s). The amount of manipulation of the selected audio object(s) may be based in part on a detected rotation of a hand(s), palm(s), finger(s) or from the rotation of a device (e.g., apparatus 50), as described more fully below. Optionally, at operation 107, the multimedia device may manipulate the characteristic "b" of the selected audio object(s) "a" by the amount of manipulation "c". In this regard, for example, the multimedia device may manipulate a characteristic(s) (e.g., loudness, etc.) based in part on the amount of rotation of the hand(s), palm(s), finger(s) or a multimedia device (e.g., apparatus 50), as described more fully below.

In response to detection of a gesture (e.g., a predefined gesture (e.g., a fist-gesture)) denoting user dissatisfaction with a manipulation of a selected audio object(s), the multimedia device may undo or disregard the most recent manipulation based on the dissatisfaction of the user.

As described above, the operations (e.g., operations 101-107) of FIG. 4 may be repeated by the multimedia device for each audio object(s) that the user desires to manipulate. In an example embodiment, the manipulation of an audio object(s) may be performed, by the multimedia device (e.g., apparatus 50 or communication device 90), separately for each audio object or simultaneously for a group of audio objects. To manipulate a group of audio objects, more than one audio object may be selected during operation 101 of FIG. 4. In one example embodiment, the multimedia device may detect the group of selected audio objects in an instance in which the multimedia device detects a hand or device (e.g., apparatus 50) drawing a circle "into the air" around a location/direction of an audio object(s). As such, the multimedia device may facilitate manipulation of each of the selected audio objects of the group.

Since directional gestures may be utilized for manipulation of audio objects according to an example embodiment, a user may manipulate the spatial audio that the user is listening to with a clear association between actions in the physical space around the user and the spatial audio (e.g., virtual spatial audio) around the user. As such, a quick, smooth and natural interaction may be obtained to control spatial audio.

Referring now to FIG. 5, a flow diagram an example embodiment is provided. In FIG. 5, a device such as, for example, communication device 90 may detect one or more hand gestures to manipulate one or more selected audio objects. The hand gestures may be gestures of a bare hand of a user that may not necessarily be currently holding an apparatus (e.g., apparatus 50). As described above, the communication device 90 may be embodied in a wrist band, bracelet (e.g., a wrist bracelet), game controller, ring, glove, pen, or any other device that is worn by a user or is otherwise attached to the user and which detects hand gestures of the user.

At operation 201, a gesture manager 97 of the communication device 90 may detect a hand of a user pointing in the direction of the source (e.g., a virtual source) of a particular audio object(s) ("a") that the user desires to manipulate. For purposes of illustration and not of limitation, the user may be listening to surround sound audio (e.g., music, etc.) via one or more speakers 99 (e.g., a headset, headphones, loudspeakers, etc.) and suddenly the user may hear audio from a television, or audio from another individual/user on a telephone call in the physical space (e.g., a room) of the user. As such, the user of the communication device 90 may desire to manipulate one or more audio objects (e.g., speakers (e.g., loudspeakers or virtual loudspeakers)) in the direction of the audio from the television or the telephone call. For example, the user of the communication device may desire to increase the sound volume of the audio objects (e.g., speakers (e.g., loudspeakers or virtual loudspeakers)) in the direction of the audio from the television, or the audio from the telephone call to minimize the impact of this audio from disturbing the user's listening experience of the surround sound audio (e.g., music played in surround sound audio).

By detecting a hand of the user pointing in the direction of an audio object(s) ("a") for manipulation, the communication device 90 may be aware of the location(s) and direction of the source(s) of the audio object(s) for manipulation. At operation 202, the communication device 90 may generate an acknowledgement signal (e.g., a spatial audio acknowledgement signal) in response to detecting that the user points a hand in the direction of an audio object(s). In one example embodiment, the acknowledgement signal may, for example, correspond to a beep, or more detailed identification/information such as metadata associated with the selected audio object(s) (for example, as included in Moving Picture Experts Group (MPEG) Spatial Audio Object Coding (SAOC) coding) to acknowledge that the user is pointing towards an audio object(s).

In one example embodiment, the acknowledgement signal may be a spatial audio signal with its source in the location of the detected audio object(s). In another example embodiment, a visual acknowledgement may be provided on a screen of the user input interface 95 of the communication device 90. In one example embodiment, the visual and/or audio acknowledgement may be a user selectable option in the communication device. The user may select more than one audio object to be manipulated simultaneously in a manner analogous to that described above.

Optionally, at operation 203, the gesture manager 97 of the communication device 90 may manipulate the location of the selected audio object(s) by detecting a gesture (e.g., a grab gesture) of a palm(s), finger(s), hand(s) on the selected audio object(s) and then by moving the selected audio object(s) to a new location (e.g., a location behind the user, at a side of the user, etc.). Optionally, at operation 204, the communication device 90 may manipulate the location of the selected audio object(s) ("a") by moving the selected audio object to a new location. For example, the gesture manager 97 may detect a release of the "virtual grab" while a user points his hand to the desired new direction which may trigger the gesture manager 97 to move the audio object(s) ("a") to the new location.

In an example embodiment, the distance of audio object(s) moved to the new location from the user may be the same as the distance from the user to the original location of the selected audio object(s). Although the distance may remain the same, the angle from the user may change in an instance in which a selected audio object(s) is moved to a new location. The user may perform a gesture such as, for example, a "throw" or "catch" gesture with a palm(s), finger(s), hand(s) of the user to manipulate the distance of a selected audio object(s). In this regard, in response to the gesture manager 97 detecting a "virtual throw" gesture directed away from the user (by using a finger(s), palm(s) and/or hand(s) of the user throwing or pushing a ball), the gesture manager 97 may increase the distance between the user and the selected audio object(s). On the other hand, in an instance in which the gesture module 97 detects a "virtual catch" gesture towards the user by detecting a finger(s), palm(s) and/or hand(s) catching a ball, the gesture manager 97 may shorten the distance between the user and the selected audio object(s). The user may perform these "throw" and "catch" gestures to/from any direction in the 3D audio space thus triggering the gesture manager 97 to manipulate the locations of selected audio object(s) based on these gestures.

While the gesture manager 97 performs the manipulation for a selected audio object for a location (e.g., a new location), the user may continue to hear the audio object (and/or the acknowledgement audio signal based on preferences of the user) that is being manipulated so that the user may have instant feedback of the new location while the manipulation is being performed. In an example embodiment, an error margin of about 5-10% may be allowed between the hand(s) of the user and the actual position of the selected audio object(s) to make the pointing of audio objects easier and more user-friendly. In an example embodiment, the audio objects may originate from a point-like source (e.g., a device (e.g., speakers)). However, in another example embodiment, the audio objects may not necessarily originate from a point-like source. Instead, some audio objects may originate from sources other than point-like sources that may have wider geometrics. The user may have manipulated the size of the audio object previously. As such, it may be difficult to point exactly to sources that may not be point-like sources, and in this regard some error margin may be designated for pointing to these non-point-link sources (e.g., drawing a circle around audio objects to select multiple audio objects). In one example embodiment, the error margin may be dependent (or based) on the source being more or less point-like and as such may allow a bigger error margin for less point-like sources and a lower error margin for more point-like sources.

In an instance in which there are several audio objects in the same spatial direction in which a palm(s), finger(s), hand(s) of a user is pointing, the gesture module 78 may first detect the audio object with its source closest to the user. In an instance in which the user takes no actions (e.g., does not perform a "grab", "release", "throw" or "catch" gesture) within a predetermined time window (e.g., within two seconds) the gesture manager 97 may analyze the next closest audio object(s) and may subsequently analyze the next closest audio object thereafter, etc. The user may know which audio object(s) the user is pointing at each instance based on an audio acknowledgement signal generated by the communication device 90.

Optionally at operation 205, any other characteristic of the selected audio object(s) may be manipulated (for example, characteristics other than the location (e.g., distance and angle from the user) manipulated in operation 204). Optionally at operation 206, the gesture manager 97 may detect an indication of the desired amount of manipulation of a user by detecting a palm(s), finger(s), and/or hand(s) of the user turning a virtual knob. For example, in response to an indication that a virtual knob is turned clockwise (e.g., while a hand is pointed to the virtual location of the audio object(s)), the gesture manager 97 may increase the amount of manipulation.

On the other hand, in response to an indication that a virtual knob is turned counter clockwise, the gesture manager 97 may decrease the amount of manipulation. For example, the user may point to the direction of a particular audio object and by turning the virtual knob clockwise, the sound level of the audio object may be increased by the gesture manager 97. On the other hand, in an instance in which the user points to the direction of the particular audio object and turns the virtual knob counter clockwise, the sound level of the audio object may be lowered by the gesture manager 97. Adjustment by rotation may enable the user to keep pointing to the source of the audio object(s) (and hence identifying which audio object(s) the user desires to be manipulated) while at the same time selecting the adjustment by rotation of the virtual knob. In some example embodiments, the sound level characteristic may be set as the default characteristic for the manipulation. However, the user may by using any gesture(s) other than the gestures utilized for moving audio objects (e.g., "grab", "release", "throw", "catch", etc.) and adjusting the amount of manipulation (e.g., "turning knob") may specify any other characteristic (e.g., muting, echo, etc.) of the audio object to be manipulated. In some example embodiments, these gestures may be predefined. In other alternative example embodiments, the gestures may be defined, via the user input interface 95, by a user and may be user specific. The communication device 90 may be informed as to which gesture(s) (e.g., predefined or user-defined) corresponds to a particular characteristic(s).

The particular characteristic(s) to be modified may, for example, be identified by a number of fingers that are raised (e.g., with audio feedback to confirm to the user that the desired characteristic is about to be manipulated upon turning a virtual knob). As described above, the manipulation may be performed in two operations such that the characteristic is first chosen (for example, with a loudness adjustment being the default) (e.g., operation 205). Subsequently, the altering of the characteristic may be performed by rotating the virtual knob to increase/decrease the impact for the selected audio object(s) (e.g., operation 206). Additionally or alternatively, the user input interface 95 (e.g., via buttons, menus, tabs, etc. designated for characteristics) of the communication device 90 may be utilized for choosing a characteristic to be manipulated. Optionally, at operation 207, the gesture manager 97 may manipulate the location together with another selected characteristic(s) (e.g., lowering of sound of the selected audio object(s)). By detecting a gesture (e.g., a predefined gesture (e.g., a fist gesture)), of the user, the gesture module 97 may cancel the most recent manipulation in an instance in which the user is not satisfied with the manipulation.

Since the pointing direction may be detected, by the gesture manager 97 based on a hand direction, the user may start gesturing with a palm(s) and fingers in an instance in which the hand(s) of the user is already pointing to the audio object. However, pointing and gesturing may not necessarily be sequential actions. The gesturing may have an impact on an audio object(s) in an instance in which the hand(s) points to the direction of the audio object(s). In one example embodiment, both hands may be used simultaneously for the manipulation allowing two audio objects to be manipulated simultaneously.

In an example embodiment, a user may select multiple objects one-by-one which may enable the gesture manager 97 to manipulate properties of multiple audio objects with one gesture. For example, a user may select audio objects a1, a2 and a3 and in response to detecting a control gesture of a hand of the user, the gesture manager 97 may, for example, mute each of the audio objects a1, a2, a3 or may transfer the audio objects a1, a2, a3 to a new spatial position, etc. In a virtual auditory design environment, multiple object selection may be a beneficial feature. In one example embodiment, a user may utilize a hand(s) to virtually draw a circle around multiple audio objects and in response to detecting the drawn circle the gesture manager 97 may select the multiple audio objects. In another example embodiment, the gesture manager 97 may detect a selection of more than one audio object into a set in response to detecting a hand of the user pointing to the direction of each audio object sequentially and rapidly, one-by-one.

The communication device 90 may be configured to show visualization, via display 88, of the audio objects and their locations, and the manner in which the selected audio objects are moved or otherwise manipulated. The visual acknowledgement (in addition to audio acknowledgement) may also be provided on the display 88 or a display of the user input interface 95 indicating to the user that an audio object(s) has been detected and providing more detailed information about the audio object(s) based on the metadata associated with the audio object(s). The audio acknowledgement (e.g., feedback) of a selected audio object(s) may be a continuous audio signal (e.g., a long beep or buzz noise) associated with the selected audio object. Alternatively, the audio acknowledgement may be a recognizable modification or manipulation of the original audio object signal (e.g., modulation). As long as the audio object(s) is selected the acknowledgement signal may be active. The acknowledgement signal may also be generated by the communication device in other modalities such as, for example, visual or haptic.

Referring now to FIGS. 6A and 6B, diagrams illustrating a user choosing an audio object are provided according to an example embodiment. In the example embodiment of FIGS. 6A and 6B, a device (e.g., communication device 90) may detect/capture (for example, via one or more speakers (e.g., speakers 79)) audio of audio object 1, audio object 2, audio object 3 and audio object 4 in the physical space of a user. The audio objects 1, 2, 3, and 4 may correspond to spatial audio signals related to sounds (e.g., items of audio) that may be output by the device and listened to by a user of the device. Although four audio objects are shown in the example embodiment of FIGS. 6A and 6B any suitable number of audio objects may be detected by the device. As shown in the example embodiment of FIG. 6A, a user of the device (e.g., communication device 90) may point a hand, palm, or finger(s) in the direction of audio object 2. In response to detecting that the user points the hand, palm or finger(s) in the direction of audio object 2, a gesture manager (e.g., gesture manager 97) may detect the selection of audio object 2 by the user and may provide an acknowledgement (e.g., a spatial audio acknowledgement, a visual acknowledgment) to the user verifying that the device detects the selection.

In the example embodiment of FIG. 6B, a user of the device (e.g., communication device 90) may point a hand, palm, finger(s) in the direction of audio object 4. In response to detecting that that user points the hand in the direction of audio object 4, a gesture manager (e.g., gesture manager 97) may detect the selection of audio object 4 by the user and may provide an acknowledgement (e.g., a spatial audio acknowledgement, a visual acknowledgment) to the user verifying that the device detects the selection. In one example embodiment of FIGS. 6A and 6B, gesturing with a hand, palm(s), and/or finger(s) may be started when pointing to the audio object (e.g., audio object 2, audio object 4) for selection.

Referring now to FIG. 7, a diagram illustrating a mechanism for manipulating one or more characteristics of an audio object is provided according to an example embodiment. The characteristics may include, but are not limited to, altering of an angle, distance, location, a size or any other characteristic of an audio object. In the example embodiment of FIG. 7, in response to a gesture manager (e.g., gesture manager 97) detecting that a user points with a hand towards an audio object "a" (for example, the virtual source of the audio object "a"), the gesture manager may enable the user to manipulate the characteristics of audio object "a". To adjust the volume of the audio object "a", the user may point towards audio object "a" with his hand and may perform a "turning knob" gesture and rotate a virtual knob. For instance, in response to the gesture manager detecting that the virtual knob is rotated clockwise, the gesture manager may increase the volume of audio object "a". On the other hand, in response to the gesture manager detecting that the virtual knob is rotated counter clockwise by the hand of the user, the gesture manager may lower the volume of the audio object "a".

Additionally, the gesture manager may move the audio object "a" to a new location in response to detecting that the hand of the user performs a grab gesture on the audio object "a", moves the audio object "a" to a new location and performs a release gesture of the audio object "a". In an instance in which the gesture manager moves the audio object "a" to a new location, the angle between the user and the audio object "a" at the new location may be different from the angle of the user to the audio object "a" at its original location. However, the distance between the user and the audio object "a" at the new location and the distance between the user and audio object "a" at its original location may be the same. The gesture manager may change the distance between the user and the selected audio object "a" in response to detecting a hand of a user performing a gesture (for example, a throw gesture, a push gesture, a catch gesture or a pull gesture). For instance, in response to detecting that a hand makes a throw gesture or a push gesture, the gesture manager may move the audio object "a" at a distance further away from the user. The volume of the audio object "a" may seem lower to the user in response to the audio object "a" being moved at a distance further away from the user. In addition, the level of optional artificial room effect for this source may be changed at the same time when the distance of the audio object is changed. On the other hand, in response to detecting that a user makes a catch gesture or a pull gesture, the gesture manager may move the audio object "a" at a distance closer to the user. In this regard, the volume of the audio object "a" may be louder to the user in response to the audio object "a" being moved at a distance closer to the user. Additionally, the gesture manager may alter a size of the selected audio object. For example, the gesture manager may increase a size of the audio object or may decrease the size of the audio object. In this regard, for example, the gesture manager may alter the size of the audio object in response to detecting a pinch or zoom gesture of a hand(s) of a user.

Referring now to FIG. 8, a flow diagram according to an example embodiment is provided. In the example embodiment of FIG. 8, the apparatus 50 may be utilized as a pointing device and the gestures may be performed using the apparatus. In an alternative example embodiment, a device (e.g., communication device 90) connected to (for example, via a direct connection or a wireless connection) and the apparatus 50 may be utilized as the pointing device and the gestures may be made using the connected device (e.g., communication device 90). In the alternative example embodiment in which the communication device 90 may be connected to the apparatus 50, the gesture module 78 may utilize the sensor data received from the camera 93, orientation module 91 or other sensors of the communication device 90 to track the pointing direction and determine the gestures. In another alternative example embodiment in which the communication device 90 is connected to the apparatus, the gesture module 78 may utilize the sensor data from the orientation module 71, camera module 36 or other sensors of the apparatus 50 and may optionally also utilize sensor data received from the camera 93, orientation module 91 or other sensors of the communication device 90 to track the pointing direction and determine gestures.

At operation 301, a gesture module (e.g., gesture module 78) may detect an instance in which a user points a device (e.g., apparatus 50, communication device 90 connected to apparatus 50) towards a spatial location of audio object "a" that user desires to manipulate. As described above, the movement, acceleration, orientation, position, direction sensors (e.g., orientation module 71, camera module 36) in the device (e.g., apparatus 50) or external (e.g., orientation module 91, camera 93) to the device may be utilized by the gesture module to detect the direction that is pointed towards. At operation 302, the device (e.g., apparatus 50) may generate an acknowledgment (e.g., an audio acknowledgment, a visual acknowledgement) indicating to the user that the gesture module detects the selected audio object "a". Optionally, at operation 303, the gesture module may detect a gesture(s) (e.g., a grab and release gesture) or selection of an input (e.g., selection via a button, tab, menu, etc., of the user interface 67, to move the audio object "a" to a new location) indicating that user desires to move the selected audio object "a" to a new location.

Optionally at operation 304, the gesture module may manipulate the location of audio object "a" by moving the audio object "a" to the new location. Optionally at operation 303, the gesture module may detect a selection of a characteristic to be manipulated. The detection of a selected characteristic "b" may be in response to receipt of an input from an input device (e.g., user interface 67). For purposes of illustration and not of limitation, the gesture module may detect that a characteristic associated with a loudness of the audio object "a" is selected for manipulation. Optionally at operation 306, the gesture module may detect an amount of manipulation "c" in response to detecting a rotation of the device (e.g., apparatus 50). At operation 307, the gesture module may manipulate the selected characteristic "b" (e.g., loudness) of audio object "a" by the amount of manipulation "c".

In an example embodiment in which a device (e.g., apparatus 50) is utilized as the pointing device the user may point the device towards the spatial location of the virtual source of the audio object that the user desires to manipulate. In this regard, the device may utilize detected movement, acceleration, orientation, position, direction measurements or any other measurements of sensors inside (e.g., orientation module 71, camera module 36) or external (e.g., orientation module 91, camera 93) to the device (e.g., apparatus 50) to detect the direction that is pointed towards. In one example embodiment, a gesture module may detect a "turning knob" gesture in response to detecting turning of the device as a "virtual knob". As such, in response to pointing the device to the direction of a particular audio object(s) and by turning the device as "virtual knob", a characteristic (e.g., sound level) of that audio object(s) may be manipulated by the gesture module.

In this example embodiment, the "grab", "release", "throw" and "catch" gestures may be performed based on an input(s) received from an input device(s) (e.g., buttons of user interface 67) on the device or by using touch/pressure sensors of the device (e.g., touch pressure sensors of the touch screen of display 85). The touch/pressure sensors may enable the user to control the selected audio objects based on simulated gestures using the device (e.g., apparatus 50) as simulating a "ball" and hence having a natural feel in performing actions. Any other input mechanism in the device may also be utilized for detecting gestures. Additionally, hybrid implementations may also be utilized. In one example embodiment, the device (e.g., apparatus 50) may be used for pointing to identify an audio object(s) to be manipulated and some or all of the manipulations may then be performed by the gesture module in response to detecting gestures of a palm(s), finger(s) and/or hand(s).

In an example embodiment, the device may be configured to show visualization, via display 85, of the locations of the audio objects and the manner in which the audio objects are moved or otherwise manipulated. The device may generate an audio and/or visual acknowledgement in response to detecting a selected audio object(s). The visualization may be beneficial in an instance in which the user is pointing to the audio objects with a device in his hand. In this regard, from the display (e.g., display 85) of the device, the user may instantly see the audio objects in the direction that the user is pointing towards. This may help the user to point towards an audio object(s) accurately. As described above, the user may see a visual acknowledgement on the display (e.g., display 85) of the device in an instance in which the device detects an audio object.

The feature of audio and visual acknowledgement may also be beneficial as a "spyglass/telescope" for retrieving any metadata associated with any pointed audio object (e.g., a participant in a teleconference) even though the user may not necessarily manipulate the characteristics of the audio object. This feature may provide a natural manner for the user to retrieve the metadata associated with a particular audio object.

Referring now to FIG. 9, a diagram illustrating manipulating of characteristics of an audio object is provided according to an example embodiment. In the example embodiment of FIG. 9, the gesture module may determine that the user is pointing a device (e.g., apparatus 50) towards audio object "a" (e.g., a virtual source of audio object "a"). In response to detecting that the device is pointed towards the audio object(s) "a", the gesture module may enable manipulation of one or more characteristics of the audio object(s). The device may generate an acknowledgement (e.g., a spatial audio acknowledgement, a visual acknowledgement) in response to detecting that the audio object "a" is selected.

The gesture module may adjust a selected characteristic by an amount of manipulation in response to detecting a rotation of the device (e.g., apparatus 50) in a clockwise direction or a counter clockwise direction. For example, in order to adjust a selected characteristic such as, for example, a volume of the audio object "a", the user may point the device towards the audio object "a" and rotate the device in a clockwise direction to increase the volume or rotate the volume in a counter clockwise direction to decrease the volume.

In the example embodiment of FIG. 9, the gesture module may change the location of the selected audio object "a" in response to receipt of a selection via an input of an input device (e.g., selection of a button(s), tab(s), menu(s) or the like of user interface 67). In response to receipt of the selection, the gesture module may move the audio object "a" to the new location that the user points the device towards. In response to moving the audio object to the new location, the angle from the user to the audio object "a" may be changed. In an alternative example embodiment, the gesture module may change the location of the selected audio object "a" in response to detection of a gesture(s) (e.g., a grab gesture, a release gesture, a throw gesture, a catch gesture, etc.). In one example embodiment, the gestures may be made with the device in combination with a palm, fingers, and/or hand of the user. For instance, pointing of the device may be utilized to identify the audio object(s) that the device is pointing towards, and the audio object "a" to be manipulated may be performed based on detected gestures with a palm(s), finger(s) and/or hand(s).

In the example embodiment of FIG. 9, the gesture module may change the distance of the selected audio object "a" to be further away from the user in response to receipt of a selection of input (e.g., selection of a button(s), tab(s), menu(s), etc. via user interface 67). In another example embodiment, the gesture module may change the distance of the selected audio object "a" to be further away from the user in response to detection of a throw gesture being made with the device. The gesture module may also change the distance of the selected audio object "a" to be closer to the user in response to receipt of a selection of input (e.g., selection of a button(s), tab(s), menu(s), etc. via user interface 67). In another example embodiment, the gesture module may change the distance of the selected audio object "a" to be closer to the user in response to detection of a catch gesture being made with the device. Additionally, in one example embodiment, the gesture module may alter a size of the selected audio object "a". For instance, the gesture module may increase a size of the audio object "a" or may decrease the size of the audio object "a". In this regard, for example, the gesture module may alter the size of the audio object in response to detecting a pinch or zoom gesture being made with the device or in response to receipt of a selection of input (e.g., selection of a button(s), tab(s), menu(s), etc. via user interface 67).

Referring now to FIG. 10, an example embodiment for manipulating one or more characteristics of an audio object according to an example embodiment is provided. In this example embodiment, the rotation of the device (e.g., apparatus 50) or the rotation of a hand(s), palm(s), and/or finger(s) controlling the amount of manipulation for the audio objects (and/or the mechanism to choose the characteristics to be manipulated) may be replaced by movement of the device or of the hand(s), palm(s), and/or fingers of a user. The movement may be performed in one dimension (1D), two-dimensions (2D) or three dimensions (3D). In the 1D example embodiment, instead of rotating the device, the amount of manipulation of a selected audio object(s) may be adjusted, for example, by moving the device horizontally. In this regard, moving the device right horizontally may, for example, increase the amount of manipulation and moving to device to the left horizontally may, for example, have the opposite effect of decreasing the amount of manipulation. For instance, the sound volume of an audio object(s) may be increased or decreased by moving the device horizontally to the right or the left, respectively.

In the 2D example embodiment, the amount of manipulation may be adjusted by both horizontal and vertical movements. Additionally, in the 3D example embodiment, the amount of manipulation may be adjusted by moving the device in all three dimensions (e.g., x, y, z dimensions). With 2D movements, the user may, for example, draw with a hand(s) a curve for graphical equalization "in the air". In the 3D example embodiment, the user may for example move the location of the source of a selected audio object(s) with small movements of the device (e.g., apparatus 50) that may be reflected into larger movements of the source of the selected audio object(s) (e.g., in the space around the user), for example, by using the device as "3D mouse" or "3D trackpad". Other suitable gestures (or buttons on the device) may be utilized to select (e.g., "lock into") and deselect (e.g., "lock out") the audio object(s) to be manipulated.

In another example embodiment, there may be more than one device (or hand/palm) used for manipulating a selected audio object(s) in the same spatial listening session. For example, in a gaming environment more than one player may manipulate the audio objects of a same audio scene at the same time (for example, by each person using their own device or hand(s), palm(s), and/or finger(s). The point-of-listening (e.g., the virtual location within the audio scene) may be different for each of the listeners/players, and may be user selectable.

In addition, the gesture module 78 and/or gesture manager 97 may create new or delete existing audio objects instead of manipulating existing audio objects. In another example embodiment, the user may move (e.g., a change of listener position and orientation properties) in the virtual audio environment with gestures, instead of (or in addition to) moving the audio objects.

In another example embodiment, location detection may be utilized. For example, a user may have a 'static' (e.g., fixed) or a 'dynamic' location within a spatial audio scene as a user selectable option. In response to selecting 'dynamic location', the physical movements (and orientation) of the user may be tracked by a GPS, the positioning sensor 72, the positioning sensor 92 or any other location/orientation detection mechanism. In this regard, the virtual audio scene around the user (e.g., the audio in the physical environment of the user) may be updated according to the changes in location/orientation of the user (for example, the user's point-of-listening may change).

For purposes of illustration and not of limitation, consider an example in which a user is participating in a teleconference or listening to music. In this example, presume that Peter (e.g., a fictitious person) is participating in a spatial audio teleconference (or is listening to music) using a smartphone (e.g., apparatus 50) with a headset/headphones while Anna (e.g., another fictitious person) suddenly enters the room. When Peter notices Anna entering the room and Anna desiring to speak with him, Peter may make a gesture with his hand (or with the smartphone) on an audio object(s) (e.g., sound from a speaker) in the direction of Anna and may instantly reduce the volume of the audio object(s) so that he can hear what Anna is saying while still being able follow the teleconference (or listen to the music) uninterrupted. Later, there may be a sudden loud noise in the surroundings preventing Peter from hearing speakers (or musical instruments) in the direction of the noise. By utilizing an example embodiment, Peter may instantly increase the sound volume of an audio object(s) (e.g., a speaker(s)) located in the direction of the noise, and may re-position the audio object elsewhere in the 3D audio space to minimize the impact of the noise disturbing the listening experience. As such, an example embodiment enables easy, quick and natural manipulation of surround sound audio since the user may manipulate the spatial audio the user is listening to with clear association between actions of the user in the physical space around the user and the spatial audio around the user. This enables instant manipulation of the audio objects and as such the user is able to interact quickly and precisely with audio objects.

As another example, for purposes of illustration and not of limitation, consider an example of an auditory scene design in which a user may perform audio painting. For example, consider an example in which Anna (e.g., a fictitious person) is listening to music with a 5.1 loudspeaker arrangement, but she wants to interact with the music to be creative and play with the music and make the music more pleasant to her. By using her hands (e.g., to perform a "hand audio painting" gesture) or a smartphone (e.g., apparatus 50) (e.g., to perform an "audio paint brush" gesture) Anna may easily, by using an example embodiment, move selected audio objects (e.g., virtual sources of selected audio objects) to new locations and may modify the selected audio objects as she desires. Additionally or alternatively, Anna may generate new audio objects and/or remove/silence existing audio objects.

As another example, for purposes of illustration and not of limitation consider a gaming example. In this example, presume David (e.g., a fictitious person) and Suzy (e.g., a fictitious person) are listening to the same spatial audio signal and, by utilizing an example embodiment may modify a same audio scene in a game-like fashion. In this regard, David and/or Suzy may make "throw" gestures on the audio objects (e.g., virtual sources of the audio objects) and may try to hit each other with the audio objects while playing the game (e.g., playing an audio-angry-birds game). By having different locations (e.g., points-of-listening) with respect to the virtual audio space around them, David and Suzy may be throwing one or more of the audio objects like virtual balls to each other by performing "catch and throw" gestures for example.

David and Suzy may have 'static' (e.g., fixed) or 'dynamic' locations within the spatial audio scene as usage options. In response to selecting dynamic locations, the physical movements may be tracked by GPS, the positioning sensor 72, positioning sensor 92 or any other location detection mechanism. As such, the audio scene around David and Suzy may be updated (e.g., individually for both) according to the changes in their positions (e.g., points-of-listening). There may even be two teams of players playing audio-volley-ball (or any other ball-game) by utilizing an example embodiment of the invention. Since the "audio ball" may be virtual, the players may not need to be in the same physical space.

Moreover, in one example embodiment, in an instance in which a selected audio object(s) corresponds to a stereophonic audio signal(s) or monophonic audio signal(s), the apparatus 50 and/or the communication device 90 may make the stereophonic audio signal(s) or the monophonic audio signal(s) spatial to originate from some spatial position. On the other hand, in an instance in which the stereophonic audio signal(s) or monophonic audio signal(s) is not made spatial by the apparatus 50 and/or the communication device 90, the user may hear the stereophonic audio signal(s) or monophonic audio signal(s) inside the user's head and the user may point to his/her head to control the stereophonic audio signal(s) or monophonic audio signal(s). For example, the user may adjust a stereophonic audio signal(s) by moving the selected audio object(s) inside his head between the ears of the user by pointing to his/her head with a steady hand(s).

Referring now to FIG. 11, an example embodiment of a flowchart for enabling manipulation of one or more audio objects is provided. At operation 1100, an apparatus (e.g., apparatus 50 or communication device 90) may include means, such as the gesture module 78, the gesture manager 97, the processor 70, the processor 94, and/or the like, for detecting at least one audio object (e.g., audio object "a", audio object 2, audio object 4). The audio object may be an audio signal (e.g., a spatial audio signal, a non-spatial audio signal (e.g., a stereophonic audio signal, a monophonic audio signal, etc.)). At operation 1105, an apparatus (e.g., apparatus 50 or communication device 90) may include means, such as the gesture module 78, the gesture manager 97, the processor 70, the processor 94, and or the like, for operating a pointer (e.g., a hand(s), a palm(s), and/or a finger(s) of a user or an apparatus 50) in a selected direction by a user. At operation 1110, an apparatus (e.g., apparatus 50 or communication device 90) may include means, such as the gesture module 78, the gesture manager 97, the processor 70, the processor 94, and or the like, for detecting a gesture(s) of the pointer in response to operating the pointer in the selected direction.

At operation 1115, an apparatus (e.g., apparatus 50 or communication device 90) may include means, such as the gesture module 78, the gesture manager 97, the processor 70, the processor 94, and or the like, for controlling a characteristic(s) of the detected audio object in response to the detected gesture of the pointer or an indication of a selection of the characteristic(s). The indication of the selection may be received via an input interface (e.g., a chosen button, menu, tab or the like of user interface 67 or user input interface 95). The characteristics may include, but are not limited to, loudness, sound source orientation, distance from a user/listener, source location, echo, sustain, equalization, reverberation, delay, muting, etc.

It should be pointed out that FIGS. 4, 5, 8 and 11 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96) and executed by a processor (e.g., processor 70, processor 94, gesture module 78, gesture manager 97). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the method of FIGS. 4, 5, 8 and 11 above may comprise a processor (e.g., the processor 70, processor 94, the gesture module 78, the gesture manager 97) configured to perform some or each of the operations (101-107, 201-207, 301-307, 1100-1115) described above. The processor may, for example, be configured to perform the operations (101-107, 201-207, 301-307, 1100-1115) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (101-107, 201-207, 301-307, 1100-1115) may comprise, for example, the processor 70 (e.g., as means for performing any of the operations described above), the processor 94, the gesture module 78, the gesture manager 97 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    detecting at least one audio object;
    operating a pointer in a selected direction, by a user, towards a position of a virtual source of the detected audio object outputting audio to select the virtual source which comprises spatial audio in the selected direction;
    detecting a gesture movement of the pointer itself in response to the operating of the pointer in the selected direction towards the position of the virtual source of spatial audio associated with the detected audio object;
    controlling, via a processor, at least one characteristic of the detected audio object in the selected direction in response to the detected gesture of the pointer or an indication of a selection of the at least one characteristic; and
    manipulating the virtual source of the detected audio object via the operating of the pointer in the selected direction.

2. The method of claim 1, further comprising:
    determining an amount in which to manipulate the at least one characteristic in response to detecting a movement of the pointer; and
    manipulating the at least one characteristic of the detected audio object by the determined amount, wherein the detected audio object comprises an audio signal.

3. The method of claim 1, wherein detecting the at least one audio object in response to operating the pointer towards the detected audio object and the pointer comprises at least one of a hand, a palm, a finger of the user or a device.

4. The method of claim 3, wherein the device comprises a mobile terminal.

5. The method of claim 2, wherein detecting the movement comprises detecting at least one of a positional change of the pointer, a rotation of the pointer in a clockwise direction or a counter clockwise direction.

6. The method of claim 5, further comprising:
    adjusting the characteristic based on at least one of the positional change of the pointer or the rotation of the pointer in the clockwise direction or the counter clockwise direction.

7. The method of claim 6, wherein the pointer is associated with at least one of:
    a virtual slider that is movable in at least one dimensional axis in which the pointer is moved in the at least one dimensional axis, or
    a virtual knob that is rotatable in the clockwise direction in an instance in which the pointer is rotated in the clockwise direction and the virtual knob is rotatable in the counter clockwise direction in an instance in which the pointer is rotated in the counter clockwise direction.

8. The method of claim 1, wherein:
    controlling further comprises at least one of:
    adjusting the characteristic of the detected audio object or moving the detected audio object to a new location based in part on the user utilizing the pointer to perform one or more predefined gestures or in response to receipt of an indication of one or more selections indicating to move the detected audio object to the new location, or
    changing a distance between the detected audio object and the user based in part on detecting that the pointer is being utilized to perform at least one gesture or based in part on receipt of an indication of a selection to change the distance.

9. The method of claim 3, wherein the characteristic of the at least one detected audio object is predefined in the device by the user.

10. An apparatus comprising:
    at least one processor; and
    at least one memory including computer program code, the at least one memory and the computer program code configured to, with the at least one processor, cause the apparatus to perform at least the following:
    detect at least one audio object;
    operate a pointer in a selected direction, by a user, towards a position of a virtual source of the detected audio object outputting audio to select the virtual source which comprises spatial audio in the selected direction;
    detect a gesture movement of the pointer itself in response to the operating of the pointer in the selected direction towards the position of the virtual source of spatial audio associated with the detected audio object;
    control at least one characteristic of the detected audio object in the selected direction in response to the detected gesture of the pointer or an indication of a selection of the at least one characteristic; and
    manipulate the virtual source of the detected audio object via the operating of the pointer in the selected direction.

11. The apparatus of claim 10, wherein the at least one memory and the computer program code are further configured to, with the processor, cause the apparatus to:
  determine an amount in which to manipulate the at least one characteristic in response to detecting a movement of the pointer; and
  manipulate the at least one characteristic of the detected audio object by the determined amount, wherein the detected audio object comprises an audio signal.

12. The apparatus of claim 10, wherein detect the at least one audio object in response to operating the pointer towards the detected audio object and the pointer comprises at least one of a hand, a palm, a finger of the user, or the apparatus.

13. The apparatus of claim 12, wherein the apparatus comprises a mobile terminal.

14. The apparatus of claim 11, wherein the at least one memory and the computer program code are further configured to, with the processor, cause the apparatus to:
  perform the detecting of the movement by detecting at least one of a positional change of the pointer, a rotation of the pointer in a clockwise direction or a counter clockwise direction.

15. The apparatus of claim 14, wherein the at least one memory and the computer program code are further configured to, with the processor, cause the apparatus to:
  adjust the characteristic based on at least one of the positional change of the pointer or the rotation of the pointer in the clockwise direction or the counter clockwise direction.

16. The apparatus of claim 15, wherein the pointer is associated with at least one of:
  a virtual slider that is movable in at least one dimensional axis in which the pointer is moved in the at least one dimensional axis, or
  a virtual knob that is rotatable in the clockwise direction in an instance in which the pointer is rotated in the clockwise direction and the virtual knob is rotatable in the counter clockwise direction in an instance in which the pointer is rotated in the counter clockwise direction.

17. The apparatus of claim 10, wherein the at least one memory and the computer program code are further configured to, with the processor, cause the apparatus to:
  control the at least one characteristic by at least one of:
  adjusting the characteristic of the detected audio object or moving the detected audio object to a new location based in part on the user utilizing the pointer to perform one or more predefined gestures or in response to receipt of an indication of one or more selections indicating to move the detected audio object to the new location, or
  changing a distance between the detected audio object and the user based in part on detecting that the pointer is being utilized to perform at least one gesture or based in part on receipt of an indication of a selection to change the distance.

18. The apparatus of claim 12, wherein the characteristic of the detected audio object is predefined in the apparatus by the user.

19. A computer program product comprising at least one non-transitory computer-readable storage medium having computer-executable program code instructions stored therein, the computer-executable program code instructions comprising:
  program code instructions configured to detect at least one audio object;
  program code instructions configured to operate a pointer in a selected direction, by a user, towards a position of a virtual source of the detected audio object outputting audio to select the virtual source which comprises spatial audio in the selected direction;
  program code instructions configured to detect a gesture movement of the pointer itself in response to the operating of the pointer in the selected direction towards the position of the virtual source of spatial audio associated with the detected audio object;
  program code instructions configured to control at least one characteristic of the detected audio object in the selected direction in response to the detected gesture of the pointer or an indication of a selection of the at least one characteristic; and
  program code instructions configured to manipulate the virtual source of the detected audio object via the operating of the pointer in the selected direction.

20. The computer program product of claim 19, further comprising:
  program code instructions configured to determine an amount in which to manipulate the at least one characteristic in response to detecting a movement of the pointer; and
  program code instructions configured to manipulate the at least one characteristic of the detected audio object by the determined amount, wherein the detected audio object comprises an audio signal.

21. The method of claim 1, wherein prior to controlling the at least one characteristic, the method further comprises:
  detecting whether a location of the detected audio object is to be moved to another location based in part on the detected gesture movement.

22. The apparatus of claim 10, wherein prior to control the at least one characteristic, the at least one memory and the computer program code are further configured to, with the processor, cause the apparatus to:
  detect whether a location of the detected audio object is to be moved to another location based in part on the detected gesture movement.

23. The computer program product of claim 19, wherein prior to control the at least one characteristic, the computer program product further comprises:
  program code instructions configured to detect whether a location of the detected audio object is to be moved to another location based in part on the detected gesture movement.

* * * * *